(12) United States Patent
Hoeg

(10) Patent No.: US 12,016,256 B2
(45) Date of Patent: Jun. 25, 2024

(54) AGRICULTURAL TOOLBAR WITH WORKING AND TRANSPORT POSITIONING

(71) Applicant: WMH LEASING, LLC, New Berlin, WI (US)

(72) Inventor: William M. Hoeg, New Berlin, WI (US)

(73) Assignee: WMH Leasing, LLC, New Berlin, WI (US)

(*) Notice: Subject to any disclaimer, the term of this patent is extended or adjusted under 35 U.S.C. 154(b) by 794 days.

(21) Appl. No.: 17/039,522

(22) Filed: Sep. 30, 2020

(65) Prior Publication Data

US 2021/0007265 A1 Jan. 14, 2021

Related U.S. Application Data

(63) Continuation of application No. PCT/US2019/024529, filed on Mar. 28, 2019.

(60) Provisional application No. 62/651,688, filed on Apr. 2, 2018.

(51) Int. Cl.
*A01B 73/06* (2006.01)
*A01B 63/02* (2006.01)
*A01C 7/20* (2006.01)

(52) U.S. Cl.
CPC ............ *A01B 73/067* (2013.01); *A01B 63/02* (2013.01); *A01C 7/208* (2013.01)

(58) Field of Classification Search
CPC ........ A01B 73/067; A01B 63/02; A01C 7/208
See application file for complete search history.

(56) References Cited

U.S. PATENT DOCUMENTS

| | | | |
|---|---|---|---|
| 2,226,586 A | 12/1940 | Seaholm | |
| 4,026,365 A | 5/1977 | Andersson et al. | |
| 4,074,766 A | 2/1978 | Orthman | |
| 4,750,440 A * | 6/1988 | Pollard | A01B 63/245 111/151 |
| 5,286,050 A * | 2/1994 | Stallings, Jr. | B60D 1/02 280/504 |
| 5,363,924 A * | 11/1994 | Foley | A01B 63/145 280/405.1 |
| 5,488,996 A | 2/1996 | Barry et al. | |
| 6,068,064 A * | 5/2000 | Bettin | A01B 63/32 91/452 |
| 6,076,613 A | 6/2000 | Frasier | |
| 6,257,347 B1 | 7/2001 | Campisi | |

(Continued)

OTHER PUBLICATIONS

Invitation to Pay Additional Fees dated Jun. 25, 2019, in connection with PCT/US2019/24529.

(Continued)

*Primary Examiner* — Kevin Hurley
*Assistant Examiner* — Michael R Stabley
(74) *Attorney, Agent, or Firm* — Cook Alex Ltd.

(57) ABSTRACT

An agricultural toolbar employs at least two wing assemblies for following the contour of the land in a working position and foldable to a transport position for transit on public roads. The principal use in working position benefits from having a wide range of movement to accommodate variations in land contours and soil types. The principal use in transport mode benefits from having a compact configuration to better meet road regulations. End-uses that condition cultivatable land at multiple locations will benefit from the toolbar.

16 Claims, 21 Drawing Sheets

(56) References Cited

U.S. PATENT DOCUMENTS

| | | | |
|---|---|---|---|
| 7,562,719 | B1 | 7/2009 | Misenhelder et al. |
| 8,727,032 | B2 * | 5/2014 | Friggstad ............. A01B 73/065 |
| | | | 172/311 |
| 9,320,190 | B2 * | 4/2016 | Sauder ................... A01B 63/22 |
| 2001/0008185 | A1 | 7/2001 | Friggstad |
| 2006/0225900 | A1 | 10/2006 | Kimball |
| 2009/0200051 | A1 | 8/2009 | Tarasinski et al. |
| 2012/0175138 | A1 | 7/2012 | Friggstad |
| 2014/0034342 | A1 | 2/2014 | Friggstad |
| 2014/0124225 | A1 | 5/2014 | Sauder et al. |
| 2014/0379230 | A1 | 12/2014 | Koch et al. |
| 2017/0118903 | A1 | 5/2017 | Friggstad |
| 2017/0265373 | A1 | 9/2017 | Harnetiaux |
| 2017/0354085 | A1 | 12/2017 | Schlimgen et al. |
| 2018/0000003 | A1 | 1/2018 | Evans et al. |
| 2019/0054782 | A1 * | 2/2019 | Lasater ................... B60D 1/62 |

OTHER PUBLICATIONS

International Search Report and Written Opinion dated Aug. 22, 2019, in connection with PCT/US2019/24529.

Examination Report dated Nov. 17, 2021, issued in connection with Canadian Application No. 3,095,868.

* cited by examiner

AGRICULTURAL TOOLBAR WITH WORKING AND TRANSPORT POSITIONING

CROSS-REFERENCE TO RELATED APPLICATION

This application is a continuation of International Application No. PCT/US19/24529 filed on Mar. 28, 2019 entitled "Agricultural Toolbar with Working and Transport Positioning". The '529 application is related to and claims priority benefits from U.S. provisional patent application Ser. No. 62/651,688 filed on Apr. 2, 2018, entitled "Agricultural Toolbar with Working and Transport Positioning". The '529 and '688 applications are hereby incorporated by reference herein in their entireties.

FIELD OF THE INVENTION

The present invention relates generally to a toolbar movable between a working position and a transport position and more particularly to a toolbar that follows the contour of the land in operation.

BACKGROUND OF THE INVENTION

Industries that use toolbars, such as agriculture and construction, typically design custom configurations to match client preferences for width of usage and power of the equipment pulling the toolbar. In the agricultural industry, fields are becoming larger and individual farms cover more acres. In addition, with increasing demand for world-wide food production, agricultural operations have expanded from traditional level terrain to encompass more and more difficult and marginal terrain. Terracing has become more common, even on large scale wheat and soybean farming operations. Combined with this trend is the use of larger and larger equipment, allowing ever wider towed implements to be developed to reduce the time and labor needed for crop planting and cultivating. Other traditional implements, such as cultivators, seeders and discs, have typically employed rigid steel frames supported by wheels which are selectively movable up and down relative to the frame to set operating depths for the ground working tools on the implement.

One problem with past designs is the ability maintain proper ground contact. This is because, with the wide rigid frame and undulating terrain, some wheels may leave ground contact, lifting their associated working implements, such as discs, tines and seed drills to too shallow a depth for effective ground working. In extreme terrain, some implements may be lifted entirely out of the ground. This can cause uneven and intermittent cultivation of the soil and/or planting of the crop.

Another problem is the ability to transport the toolbar over roads when placed in transport mode. Previous rigid and flexible toolbar designs are limited based on their ability to fold into a transport mode that meet state and federal regulations for public road transportation.

Yet another problem is the ability to utilize a simple and cost-effective guidance system for crop planting and cultivating. Typical guidance system designs employ systems, such as global positioning system (GPS) to identify the unit's location. However, reliability of signal can become unreliable when guiding the toolbar from one pass to the next pass through the field.

Yet another problem with past designs is that they typically employ a single non-indexed setting for each row unit and/or implement component on the entire toolbar which is used to determine the depth of the seed that is planted. For example, the height of the gauge wheels relative to the ground is a common single setting for the entire toolbar. Employing a common non-indexed setting, or a setting that has had no verification of row-to-row and/or implement-to-implement relationship calibration, provides a less accurate reading of the depth of seed being planted in extreme terrain and/or soil conditions. With manufacturing and assembly tolerances, it is not uncommon to see a difference in depth measurement of 0.5-0.75 inches from one end of the toolbar to the other end of the toolbar. In addition, past designs typically use the same single non-indexed setting approach to compensate for component wear. Furthermore, the common non-indexed setting approach can lead to nonidentification of unique wear issues between individual row units mounted to the toolbar and lack of compensation for those unique wear issues.

Yet another problem, utilizing nonstandard geometric crop planting and cultivating with past designs can lead to disturbing seed and/or fertilizer. For example, toolbar being towed through the field can require the implements to cross over a portion of the field that has been seeded and lead to disturbance of the seed/fertilizer. This disturbance can lead to reduced return on yield at harvest.

SUMMARY OF THE INVENTION

Shortcomings of prior toolbars are overcome by a toolbar having a center support that has a first end portion, a second end portion, and a top surface. The center support defines a first longitudinal axis and second longitudinal axis. The first longitudinal axis is perpendicular to the second longitudinal axis. A first arm member is pivotally attached to the center support about the second longitudinal axis. A second arm member is pivotally attached to the center support about the second longitudinal axis. At least two wing assemblies each has a first support member, a second support member that defines a third longitudinal axis, and a mounting member. The first support member is fastened to the second support member and the mounting member. The mounting member is fastened to each of the first and second arm members.

Another aspect of the present design is an agricultural toolbar that is for use with a tractor operating in a field and in transport, although the present toolbar could be deployed in a self-propelled embodiment. The agricultural toolbar has a center support that has a first end portion, a second end portion, and a top surface. The center support defines a first longitudinal axis and second longitudinal axis, said first longitudinal axis perpendicular to said first longitudinal axis. A first arm member is pivotally attached to the center support about the second longitudinal axis. A second arm member is pivotally attached to the center support about the second longitudinal axis. At least two wing assemblies each has a first support member, a second support member that defines a third longitudinal axis, and a mounting member. The first support member is fastened to the second support member and the mounting member. The mounting member fastens to each of the first and second arm members. A pair of stabilizer assemblies each has a mounting member, and at least one movable member, for example, a wheel. The at least one movable member is mounted to the mounting member. The mounting member is mounted to the first support member. A tractor mount is fixed to the first end portion of the center support and adapted for mounting to the tractor.

Yet another aspect of the present design is an agricultural toolbar movable between a working position and a folded transport position. The agricultural toolbar has a center support that has a first end portion, a second end portion, and the second end portion has a pivot pin. A first arm member is adapted to pivot about the pivot pin. A second arm member is adapted to pivot about the pivot pin. A pair of actuation members, one of said actuation members is mounted between the first arm member and the center support. Another of the pair of actuation members is mounted between the second arm member and the center support. Actuation of the pair of actuation members in a first direction rotates the first and second arm members about the pivot pin and places the agricultural toolbar in a folded transport position from a working position. At least two wing assemblies, each has a first support member, a second support member, and a mounting member. The first support member is fastened to the second support member and the mounting member. Each mounting member is fastened to one of the first and second arm members. A pair of stabilizer assemblies each has at least one movable member that is mounted to the first support member. Movement to the folded transport position from the working position rotates the at least one movable member. A tractor mount is fixed to the first end portion of the center support and is adapted for mounting to the tractor.

The present toolbar design described and claimed herein inhibits compaction by the center section of the working implement (such as, for example, discs, tines and seed drills) to manage reliability and performance of the rest of the implement.

DETAILED DESCRIPTION OF ILLUSTRATIVE EMBODIMENT(S)

Figure 1:
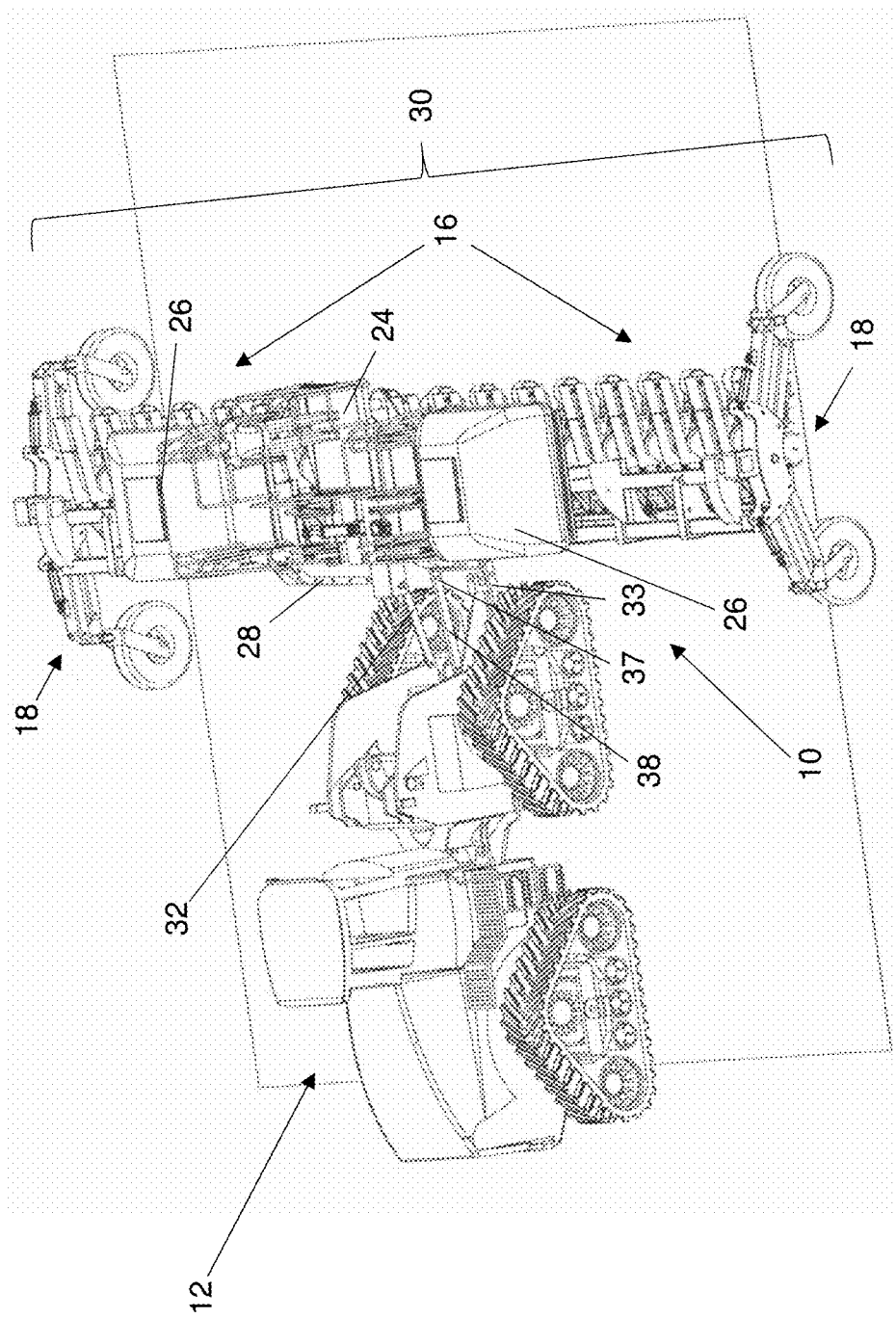
FIG. 1 is a perspective view of the present agricultural toolbar for use with a tractor in working position.

Turning to the drawings and particularly to FIGS. 1-4, perspective views of a toolbar 10 for use with a tractor 12 is shown in one embodiment of the present agricultural toolbar. As shown therein, toolbar 10 includes a center support 14, at least two wing assemblies 16, and a pair of stabilizer assemblies 18. Each of wing assemblies 16 is mounted to the center support employing a mounting member 20. Toolbar 10 is mounted to tractor 12 via a tractor mount 22. In one embodiment tractor mount 22 is a three-point hitch that employs quick connect couplings to communicate between toolbar 10 and tractor 12. In another embodiment, tractor mount 22 has a kingpin and tractor 12 has a horseshoe-shaped coupling relative to tractor mount 22. Connection of toolbar 10 to tractor 12 is through centrally mounting the kingpin with the horseshoe coupling. Other configurations can be employed as well, such as toolbar(s) for the construction industry where soil conditioning implements can be employed, such as road cutters, surface contouring, and weighted rollers. In addition, for explanation, the use of toolbar 10 in the agricultural industry, such as the planting of seed is described below. Other such applications can be employed, such as cultivating, strip tilling, and most types of soil conditioning.

Referring to FIG. 1, toolbar 10 is shown in one embodiment for planting crops. A platform 24 is mounted to each of the at least two wing assemblies 16. The platform provides support for a tank 26. Depending on the characteristics of the soil, the tank can include seed for planting or soil conditioner, such as fertilizer to improve the soil for planting. For ease of use, platform 24 has at least one retractable set of stairs 28 that provides access to the tank 26 for filling, maintenance and service. An embodiment with a retractable set of stairs 28 can include the platform 24 with a rotatable portion for positioning the retractable set of stairs 28 at different locations based upon whether toolbar 10 is in the working position or the transport position. For example, typical storage conditions for the off-season can have toolbar 10 stored in a building, thereby leading to a lack of accessibility to wing assemblies 16. With the lack of access, typical off-season maintenance that is achieved prior to planting season can be an issue. In this example, it would be beneficial to have the at least one retractable stairs 28 to be rotated about the at least two wings assemblies 18 to gain access along the center support 14 of the toolbar 10. In the field working position, access to the top area of the wing and center assemblies can be gained from the outside on both sides (namely, front and rear) of the toolbar. In the transport/storage position, access to the top area of the wing and center assemblies can be gained from the outside on both sides (namely, left and right) of the toolbar.

Figure 2:
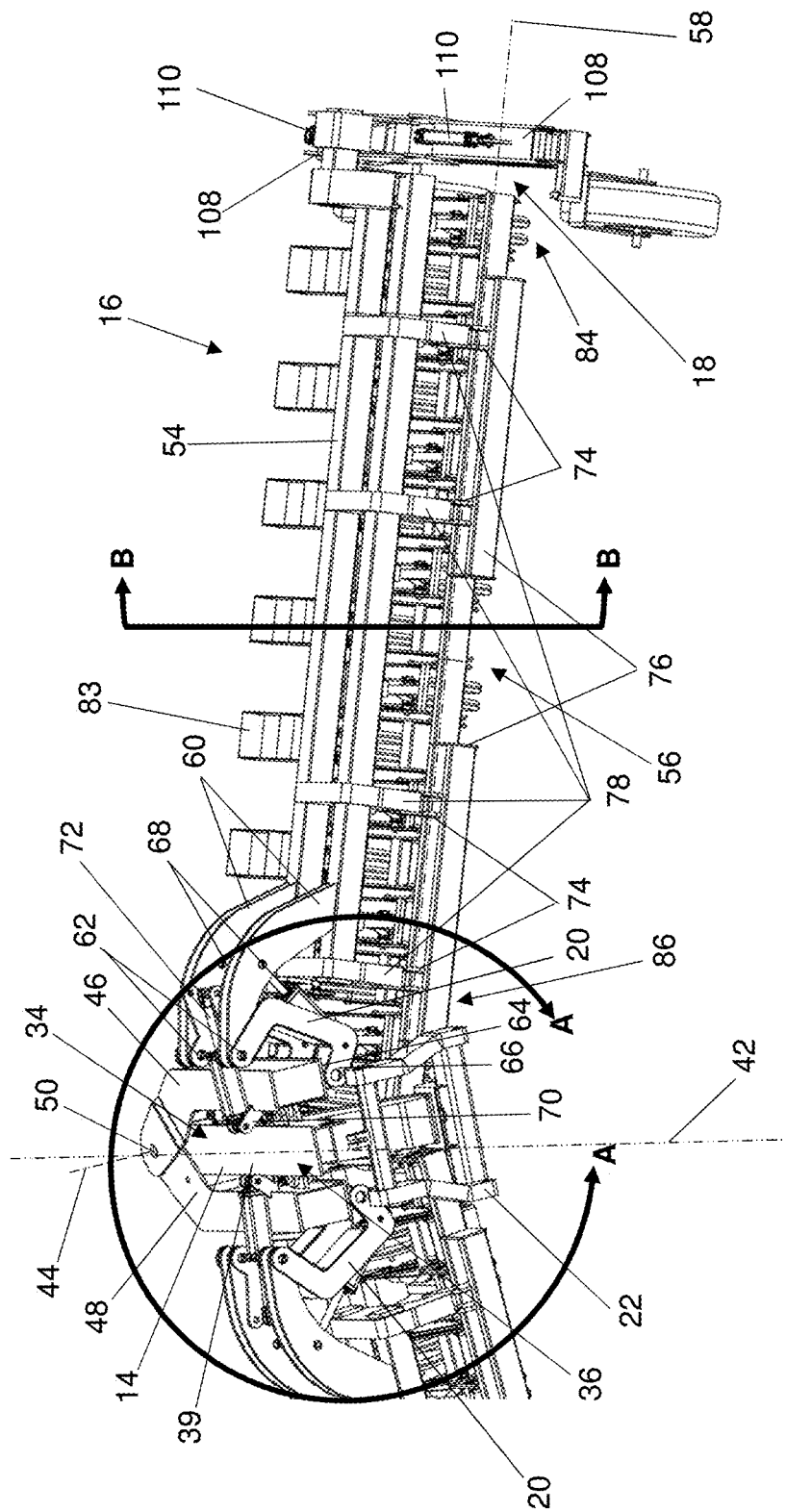
FIG. 2 is a perspective front view of one of the at least two wing assemblies of the present agricultural toolbar for use with a tractor in working position.

Referring to FIGS. 1 and 2, which show toolbar 10 in the working position, center support 14 is centrally located along toolbar 10 with tractor mount 22 attached. Tractor mount 22 is adapted to connect toolbar 10 to tractor 12. In one embodiment, tractor mount 22 is rigidly mounted to the tractor's three-point hitch with a downforce support member 32 (see FIG. 1). Center support 14 has a first end portion 34 and a second end portion 36. Tractor mount 22 is fastened to first end portion 34. Depending upon the type of terrain being cultivated, an actuation member 37 can be mounted to tractor mount 22 and to a link member 38 disposed between downforce support member 32 and drawbar 33 of tractor 12. Actuation of actuation member 37 facilitates increased downward force on toolbar 10, which aides in maintaining proper engagement of the implements mounted upon toolbar 10 with the contour of the land for uniform planting of seed. Actuation member 37 is capable of either lifting or applying downward force.

Figure 3:
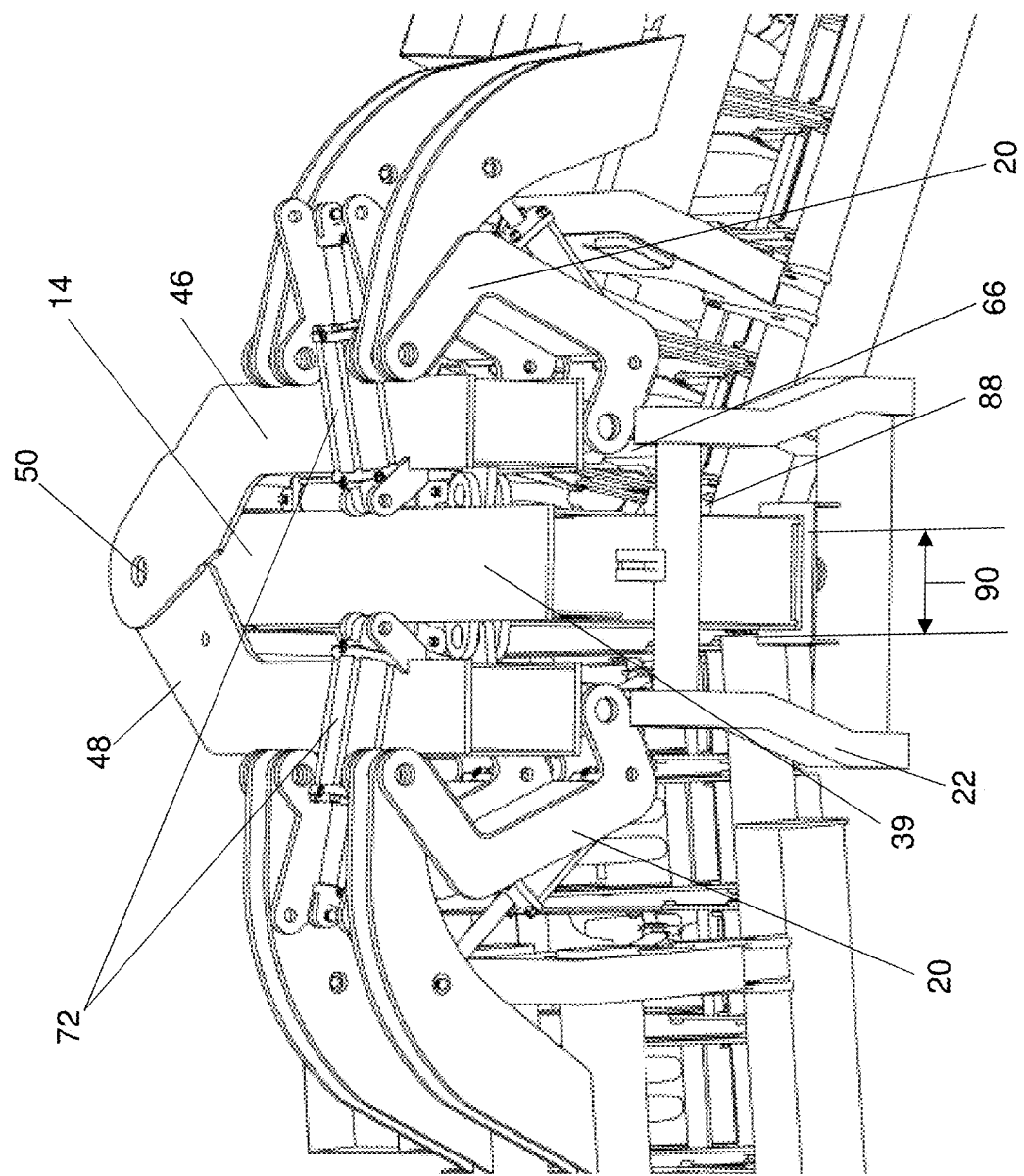
FIG. 3 is a perspective sectional view about arrows A-A in FIG. 2 of the present agricultural toolbar for use with a tractor in working position.

As shown in FIGS. 2 and 3, center support 14 includes a top surface 39, a bottom surface 40 (see FIG. 5), a first longitudinal axis 42, and a second longitudinal axis 44 that is perpendicular to first longitudinal axis 42. First and second arm members 46, 48 are each pivotally attached to center support 14 via a kingpin 50 disposed through each of the first and second arm members 46, 48, and is attached to center support 14 for rotation about second longitudinal axis 44. Other configurations can be employed as well, such as a ball joint or fifth wheel hitch. With the fifth wheel hitch, each of first and second arm members 46, 48 include a kingpin and a horseshoe-shaped coupling disposed about first longitudinal axis 42 adapted to receive each kingpin.

As shown in FIG. 2, wing assemblies 16 each has a first support member 54 and a second support member 56. Second support member 56 defines a third longitudinal axis 58. Each of wing assemblies 16 is mounted to the center support 14 in a similar manner. Mounting of one of wing assemblies 16 will be described below. In particular, mounting of one of wing assemblies 16 to first arm member 46 will be described. Mounting member 20 is disposed between first arm member 46 and first support member 54. First support member 54 has a pair of support members 60 that provide a pivotally and rigid set of connections 62 for mounting member 20 to be fastened to the pair of support members 60. The pair of support members 60 can be a steel plate or angle iron. As shown, the pair of support members 60 are attached to first support member 54 using a welded connection. Other configurations can be employed as well, such as fasteners and locking pins. The pair of connections 62 between mounting member 20 and first support member 54 can be a hinged connection adapted to permit first support member 54 to rotate about the pair of connections 62. Center support 14 includes a second pair of support members 64 that provide a pivotally and rigid second pair of connections 66 between mounting member 20 and center support 14. Second pair of connections 66 are attach to bottom surface 40 of center support 14.

As further shown in FIG. 2, with toolbar 10 in working position, the configuration of mounting member 20 is sized to clear first arm member 46 in operation. In operation, to aid uniform planting, wing assemblies 16 can be rotated about first arm member 46 to better match the contour of the field being planted. Each of wing assemblies 16 is adapted to rotate independently of the other. Rotation of first support member 54 is achieved by a pair of actuation members 68 fastened between the pair of support members 60 and mounting member 20. A pair of hydraulic actuation members 68 will be described in more detail below. Other types of activation members 68 can be employed, such as pneumatic and electrical actuation.

Figure 8:
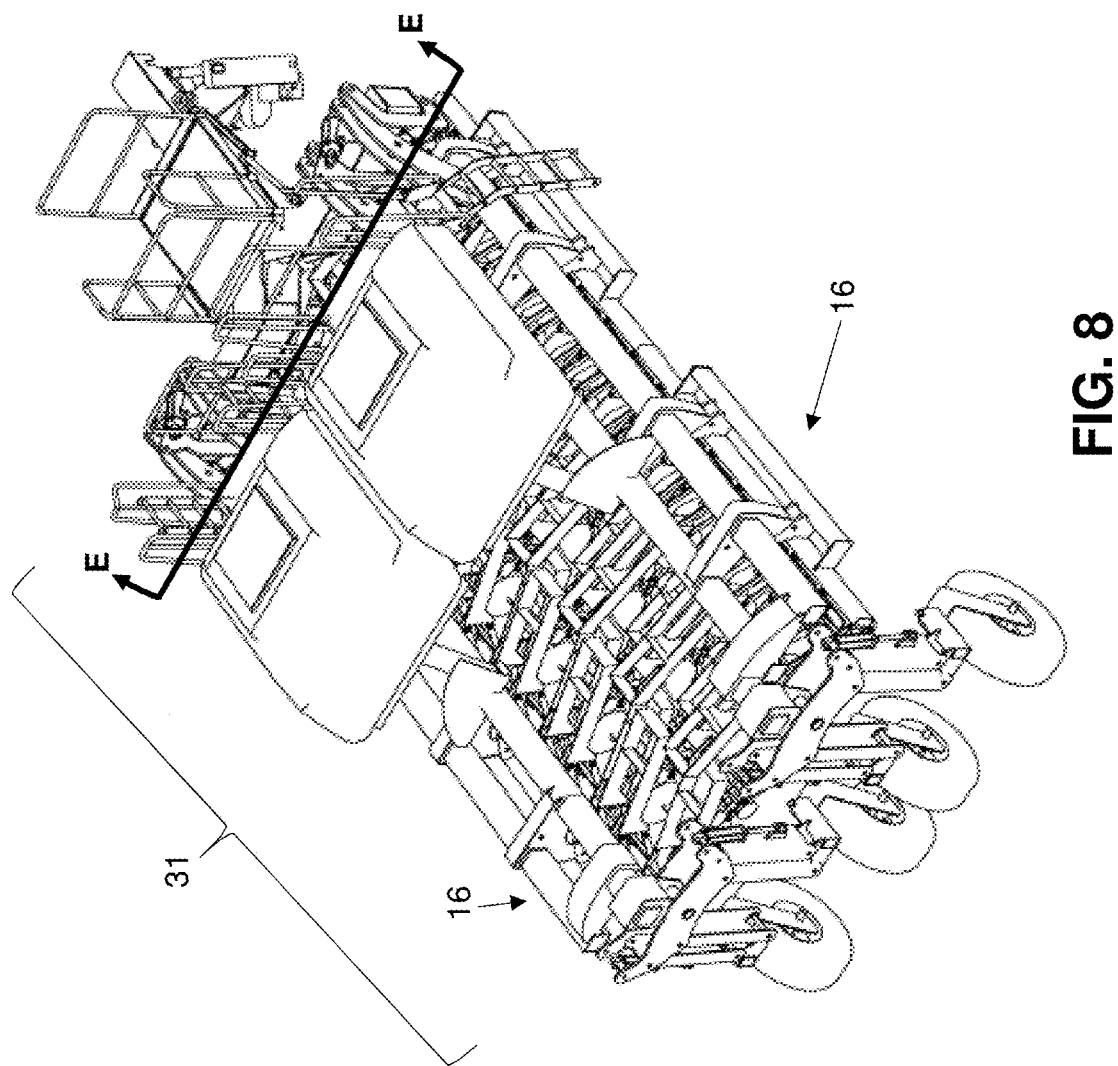
FIG. 8 is a perspective view of the present agricultural toolbar for use with a tractor in transport position.

As shown in FIGS. 1 and 8, the ability of each of wing assemblies 16 to rotate independently aids in cultivating in extreme terrain and movability between fields. For example, terraced fields can employ multiple slopes as toolbar 10 is pulled through the field. With the ability to independently match each of wing assemblies 16 with the contour and slope of the terrain, a more uniform germination of the seed which can lead to increased yields at harvest is provided. In addition, the ability to rotate each of wing assemblies 16 above the ground as toolbar 10 is moved from one field to another reduces wear to the implements mounted on toolbar 10, and/or reduces time spent moving from field to field, where rocks and debris outside the planting area may be encountered. With wing assemblies 16 rotated up and out of the terrain reduces the impact and wear of items from engaging hazards. In addition, when moving from field to field, travel over a drainage ditch, which is typically a narrow crossing, may be encountered. With prior, conventional designs, toolbar 10 would divert to a wider crossing. With the capability to provide a more compact toolbar 10 in transport position allows toolbar 10 to pass over narrow crossings and decrease the time needed to move to the next field for planting and/or cultivation.

Referring to FIGS. 2 and 3, first arm member 46 includes a third support member 70 that provides a pivotally and rigid mounting for a third actuation member 72. Third support member 70 is attached to first arm member 46. With one end of a third actuation member 72 mounted to third support member 70 and the opposite end mounted between the second pair of support members 64 and is adapted to independently push each of wing assemblies 16 outward and away from one another. In the present description, the actuation members are hydraulic, but other types of actuation, such as pneumatic and electrical actuation, can be employed.

Figure 4:
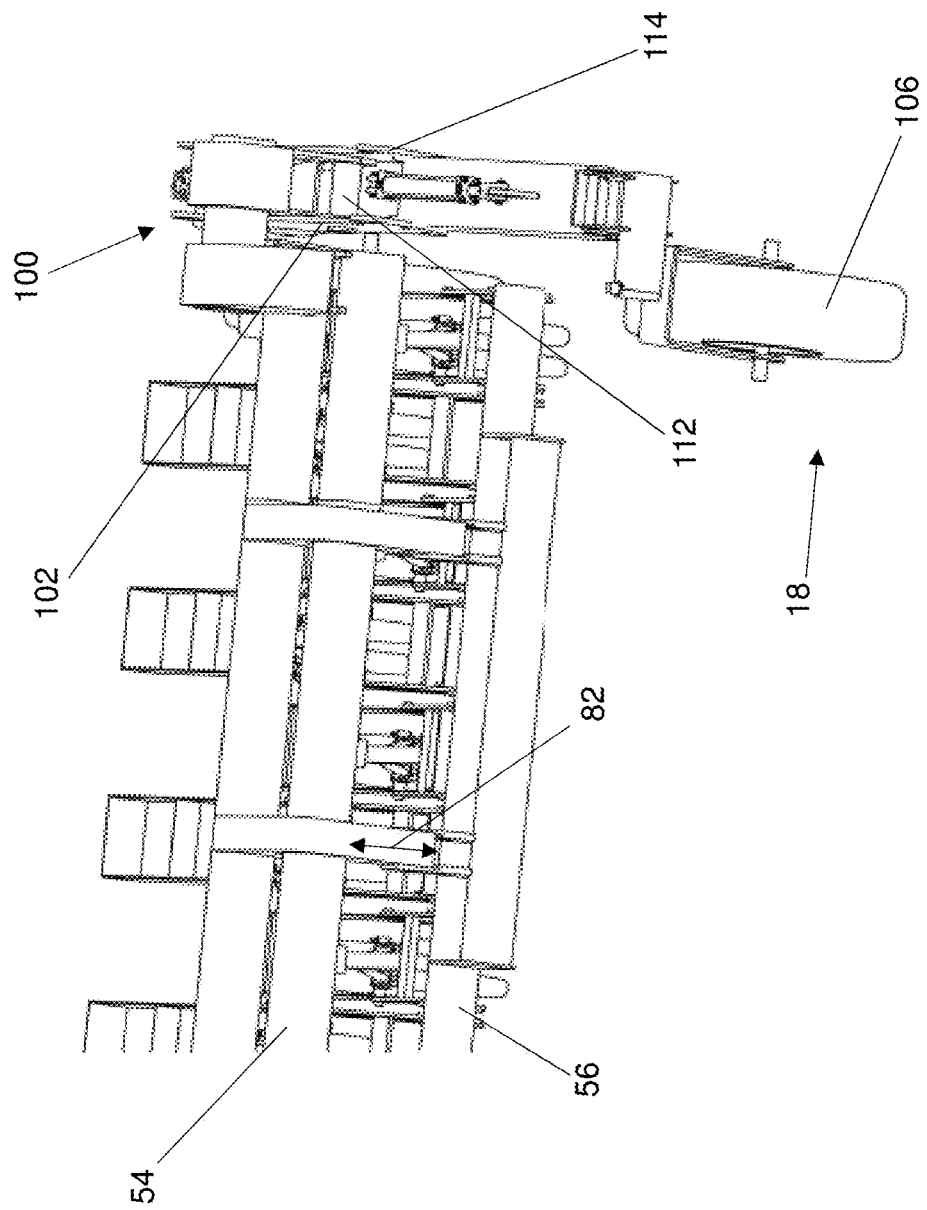
FIG. 4 is a perspective sectional view in the direction of arrows B-B in FIG. 2 of the present agricultural toolbar for use with a tractor in working position.
Figure 7:
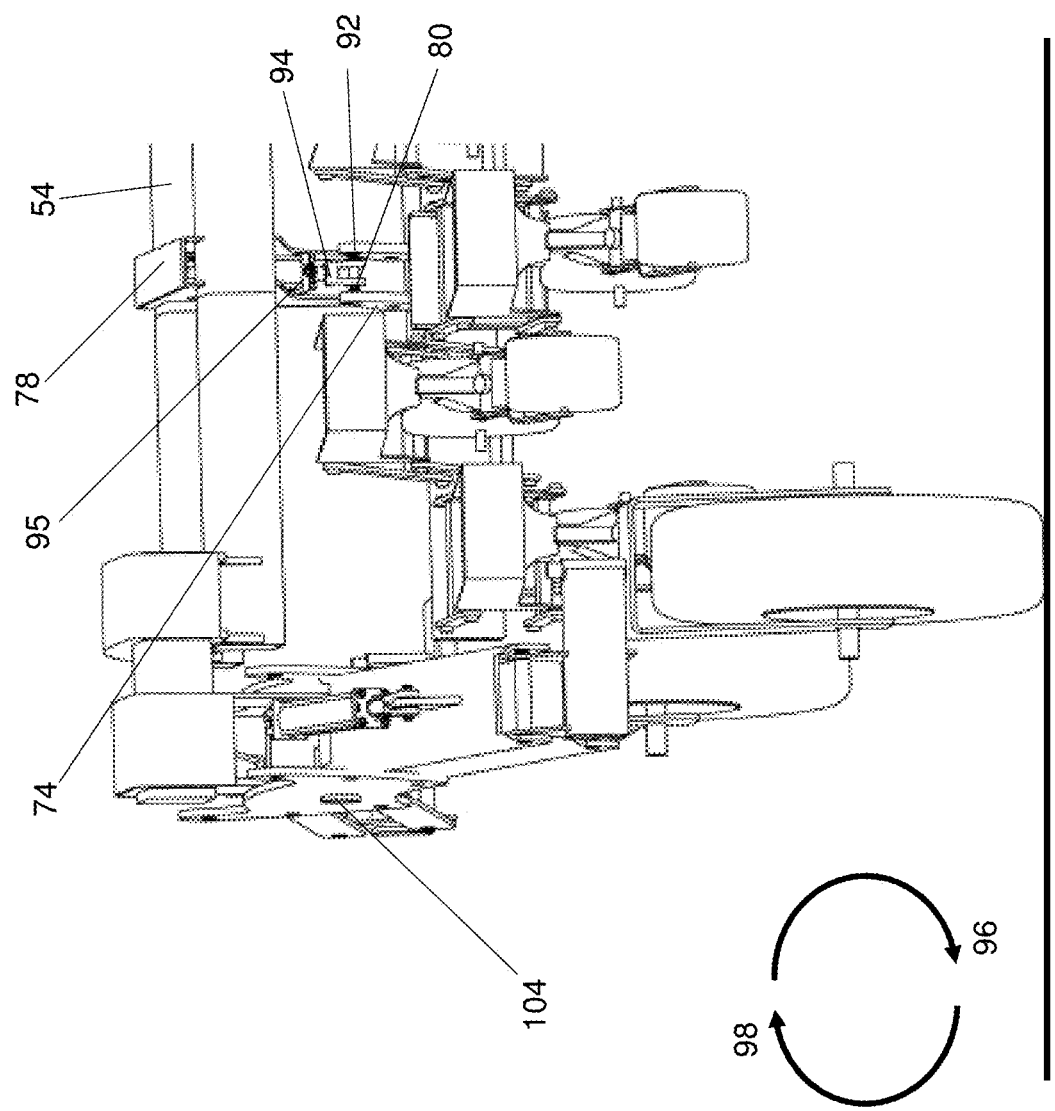
FIG. 7 is a perspective sectional view in the direction of arrows D-D in FIG. 5 of the present agricultural toolbar for use with a tractor in working position.

Referring to FIGS. 2, 4 and 7, second support member 56 is pivotally and rigidly mounted to first support member 54 and is adapted to receive the cultivating implements employed during operation, such as row units, cultivators, seeders, and discs. Second support member 56 includes a plurality of support members 74 mounted in a box frame 76 in an effort to reduce overall weight of toolbar 10. Other configurations can be employed as well, such as I-beam configurations, angle iron, and configurations that provide needed structural strength between first and second support members 54, 56. First support member 54 includes a plurality of index supports 78 that mount within each of the plurality of support members 74, forming a hinged connection 80 to the plurality of support members 74, thereby allowing rotation between first and second support members 54, 56. The plurality of index supports 78 is of appropriate height 82 to allow for rotation between first and second support members 54, 54 without interference between multiple row units 83, which are installed on second support member 56. Each of second support members 56 have an outer and inner end portion 84, 86.

Referring to FIGS. 2 and 3, a proximity sensor 88 is mounted to at least one of inner end portion 86. Proximity sensor 88 measures the proximity of one of second support members 56 with another one of second support members 56. The proximity measurement has a first magnitude 90. First magnitude 90 is compared to a desired magnitude. In cases where first magnitude 90 is below the desired magnitude, a signal is sent to third actuation member 72 to increase first magnitude 90 to the desired magnitude. Depending upon the toolbar configuration, there may be situations during operation where the contour of the land can lead to one of second support members 56 coming into close proximity with another of second support members 56 and/or at least one row unit 83 installed on toolbar 10. Employing proximity sensor 88 as described reduces the risk of collision and damage to the items mounted to toolbar 10.

As shown in FIG. 7, each of support members 74 has a second hinged connection 92 adapted to receive a second support actuation member 94. The other end of second support actuation member 94 is mounted to a third hinged connection 95 of the plurality of index supports 78 (see FIG. 1). A signal is sent to second support actuation member 94 to actuate second support actuation members 94 and provide downward movement of second support member 56 (see FIG. 4) in a first direction 96. Another signal can be sent to second support actuation members 94 and provide upward movement of second support member in a second direction 98. Each of second support members 56 can be employed independently of the other to match the contour of the land. General range of movement between the first direction 96 and the second direction 98 is from −30 degrees to +30 degrees.

Figure 6:
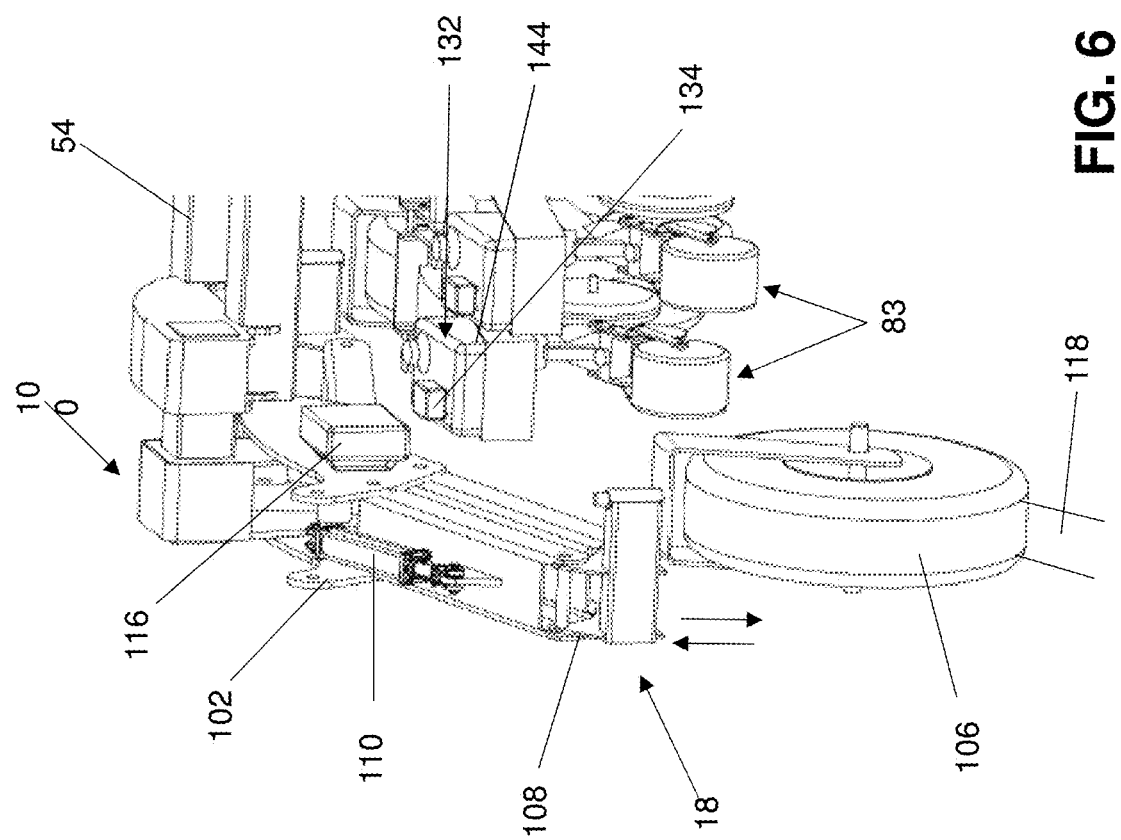
FIG. 6 is a perspective sectional view in the direction of arrows C-C in FIG. 5 of the present agricultural toolbar for use with a tractor in working position.

As particularly shown in FIGS. 4 and 6, two of first support members 54 have an outer end portion 100 that is adapted to receive a mounting member 102 of stabilizer assemblies 18. Mounting member 102 is rotatable relative to first support member 54 using a hinged connection 104 and at least one moveable member 106, which is shown in the figures as a wheel, is fastened to mounting member 102. Moveable member 106 is adapted to facilitate movement of toolbar 10 as it is towed by tractor 12. In this embodiment, moveable member 106 of each pair of stabilizer assemblies 18 is steerable, such as by a pair of fixed wheels. Other configurations can be employed as well, such as a wheel with a caster configuration, a wheel with a spinning configuration, or a track configuration. Mounting member 102 can be a multi-piece design with mounting member 102 and a pair of rigid members 108 each is pivotally attached to mounting member 102 and fastened to moveable member 106. A stabilizer actuation member 110 is mounted between a hinged connection 112 on mounting member 102 and a hinged connection 114 on each of the pair of rigid members 108. Actuation of stabilizer actuation member 110 rotates the pair of rigid members 108 downward/upward and in turn increases/decreases the clearance between the toolbar and the ground.

As shown in FIG. 6, each pair of stabilizer assemblies 18 has a guidance system, depicted in FIG. 6 as a vision system 116, mounted onto using fasteners for ease of removal when needed. Other mounting configurations can be employed as well, such as welded and adhesives. Moveable member 106 forms a guidance mark 118. Guidance mark 118 is a disturbance in the ground that vision system 116 can track. Vision system 116 is used to align toolbar 10 with guidance mark 118 as tractor 12 turns for a new pass through the field. As tractor 12 turns, one of the pair of stabilizer assemblies 18 is oriented as an inside stabilizer assembly and another is oriented as an outside stabilizer assembly. Orientation is based upon the type of turn, such as right-hand or left-hand turn. Following the direction of movement of toolbar 10, with a right-hand turn corresponds to the right hand one of stabilizer assemblies 18 being oriented as the inside stabilizer assembly. Similarly, a left-hand turn corresponds to the left hand one of the pair of stabilizer assemblies 18 being oriented as the inside stabilizer assembly.

As shown in FIG. 6, vision system 116 can include a camera and a control unit. Each camera is mounted on the inside stabilizer assembly and is adapted to capture characteristics of guidance mark 118. Typical characteristics of guidance mark 118 can be depth, width and straightness of travel. The control unit is adapted to compare characteristics captured with vision system 116 with predetermined characteristic magnitudes. Based upon the comparison, tractor 12 aligns and places one of moveable member(s) 106 on guidance mark 118 for travel through another pass in the field. In another embodiment, a laser system replaces the camera in vision system 116. The laser system captures characteristics of guidance mark 118 and is compared with predetermined characteristics and the control unit sends the signal to tractor 12. Based upon the comparison, tractor 12 aligns and places one of moveable member(s) 106 on guidance mark 118 for travel through another pass in the field. In another embodiment, the seed that is planted is coated with an indicator substance that can be captured by vision system 116. The captured characteristics of the seed, can replace the use of guidance mark 118 for placing toolbar 10 in proper alignment for another pass in the field. Based on the comparison with predetermined characteristics, tractor 12 aligns and places movable member(s) 106 along the path for another pass in the field.

As shown in FIGS. 2 and 4, first support member 54 forms a box frame with cross supports to provide appropriate robustness as toolbar 10 is towed through the field. Other configurations can be employed as well, such as a truss or triangular configuration. For example, with the triangular configuration, a tower shape that lies horizontally with the larger footprint fastened to mounting member 20 can be employed. In addition, various uses of toolbar 10 can employ additional wing assemblies (not shown). For example, large fields that can handle larger spanned toolbar 10 configurations for individual passes through the field. An additional pair of wing assemblies would be fastened to outer end portion 100 of the first support member 54. An additional wing support member is mounted to outer end portion 100. The additional wing support has a locating pin that aligns the additional assemblies with the existing wing assembly 16 that is mounted to the center support 14. With the additional at least two wing assemblies 16 aligned and in engagement with the additional wing support member, a locking pin fastens the additional at least two wing assembly 16 to the additional wing support. As previously described, the pair of stabilizer assemblies is mounted to the additional wing assemblies.

As shown in FIG. 2, in another embodiment, center support 14 is a two-piece configuration. Center support 14 has a box configuration for supporting wing assemblies 16. With the two-piece configuration, an additional support member can be sized to fit within center support 14. The additional support member can be inserted into center support 14 at first end portion 34. The additional support member is extensible relative to center support 14 from a first position where the additional support member is in retracted relationship with center support 14 and a second position where the additional support member is extended relationship with center support 14.

Figure 5:
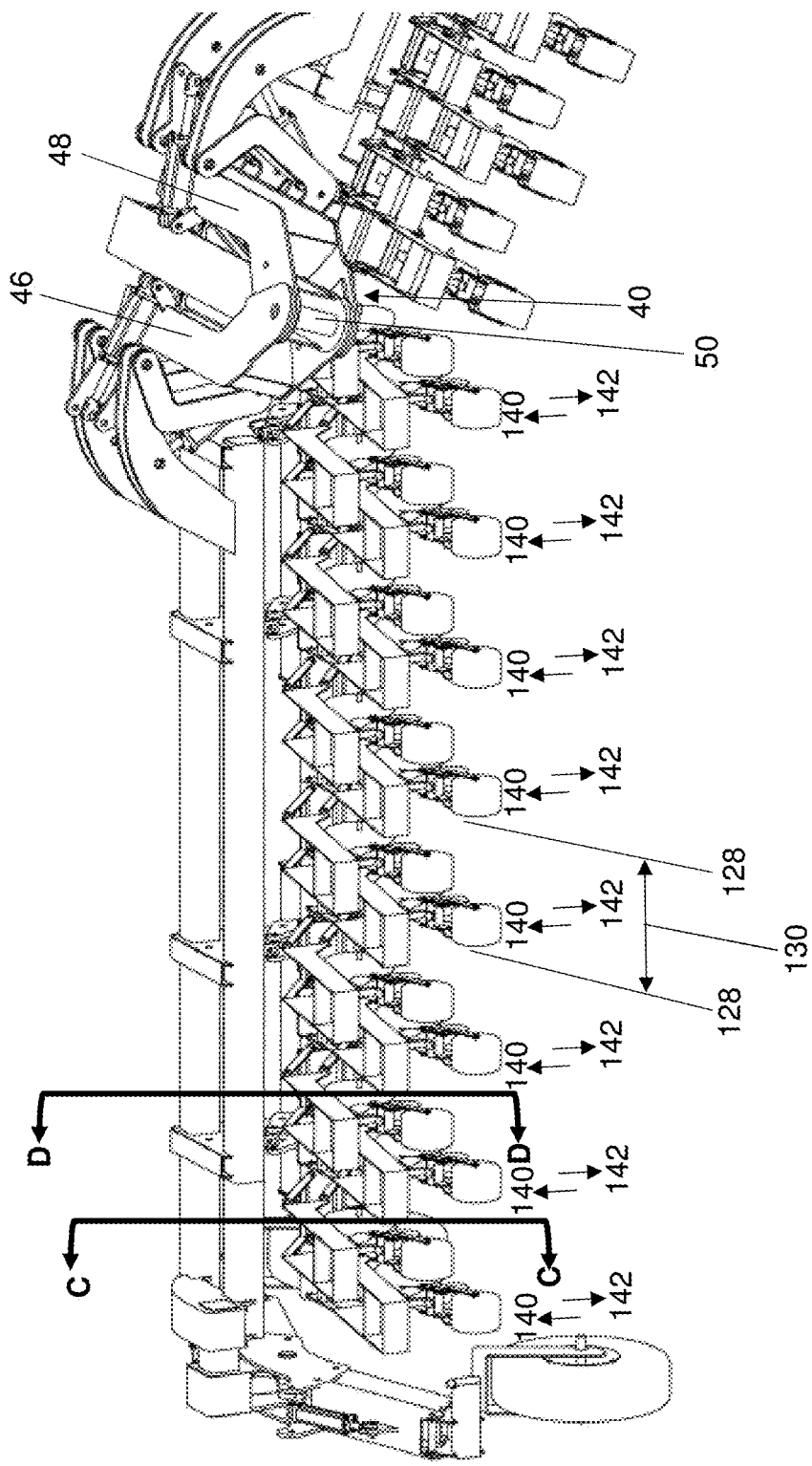
FIG. 5 is a perspective rear view of one of the at least two wing assemblies of the present agricultural toolbar for use with a tractor in working position.

Referring now to FIGS. 5-7, toolbar 10 is shown with at least one row unit 83 fastened to second support member 56 of each of wing assemblies 16. Row unit 83 can be a seed planter device. Other configurations can be employed as well, such as a tillage device or soil conditioner device. In field operation, proper placement of the row units is beneficial in achieving increased yields at harvest. Two of row units 83 are mounted to second support member 56 and each of row units 83 mounted has a centerline 128. The distance between centerline 128 of row units 83 to centerline 128 of another one of row units 83 has a predetermined magnitude 130. Predetermined magnitude 130 is typically at least four inches to facilitate proper placement of row unit(s) 83.

As shown in FIGS. 2 and 6, row unit 83 contains seed for planting. Row unit 83 is mounted to second support member 56 and adapted to plant seed. The seed is coated with an indicator substance to aid with a measurement system 132 to provide user characteristics of the seed that is planted. Indicator substances, such as graphite, talc or fluorescents can be employed. Measurement system 132 is mounted to each of row unit(s) 83 for measuring characteristics of the seed that is planted in the field, such as depth of seed, spacing between seed being planted from one of row units 83, and spacing between seed being planted from one of row units 83 and another of row units 83. Measurement system 132 includes at least one sensor 134.

As shown in FIGS. 2, 5, and 6, a control unit is employed to measure the characteristics of the seed that is planted in the ground, such as optical sensor, photo-electric eye, laser, non-optical sensor, proximity sensor, or hall-effect sensor. The characteristics measured by measurement system 132 (see FIG. 6) is compared with a predetermined desired characteristic. Based upon the comparison between the measured characteristic and the predetermined desired characteristic, the control unit sends a signal to a row unit actuation member that can adjust row unit 83 (see FIG. 2) to achieve the predetermined desired characteristic(s). The row unit actuation member is mounted on and/or between each row unit 83 and second support member 56, as previously described. The row unit actuation member can raise row unit 83 in a first direction 140 or lower each of row unit 83 in a second direction 142 (see FIG. 5). Planting of the seed includes a metering device 144 (see FIG. 6) to aid in proper spacing of the seed. Vision system 116 is adapted to track toolbar 10 through the field and identifies when toolbar 10 comes across areas of the field that have already been planted. In an effort to reduce disturbance of the seed already planted, the control unit of vision system 116 sends a signal to individual metering devices 144 as appropriate to shut off the metering device. With metering device 144 shut off, the control unit sends a signal to the row unit actuation member to raise row unit 83 in the first direction and out of the soil to minimize disturbance to the seed planted. Other situations can lead to shutting off the metering device, such as failure of component(s) and wear of components.

Figure 10:
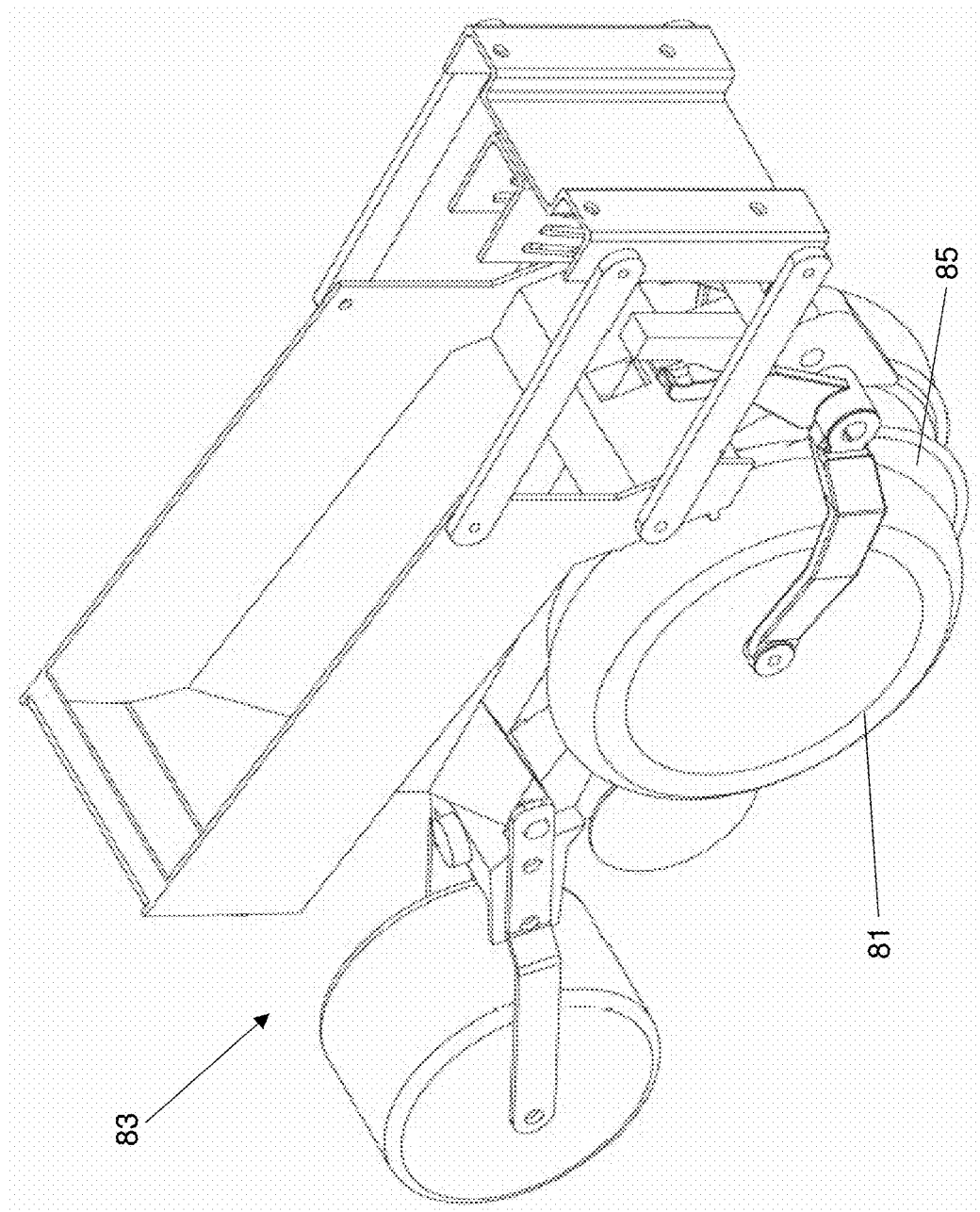
FIG. 10 is a perspective view of the components of the toolbar that facilitate indexing of the row units.

Referring to FIG. 10, as toolbar 10 is used, indexing of row unit 83 is beneficial to maintain proper and uniform planting of seed, for example when row unit 83 includes an opening disc or penetrating device. Toolbar 10 is placed on a flat surface to determine a zero point. All of row units 83 are adjusted to their shallowest position (or deepest depending on the adjustment mechanism) and then placed on the flat surface such that the row unit or penetrating device is parallel to the flat surface. The opening discs or penetrating devices are then aligned flush to its depth gauging device 85 and/or wheel 81. This point is then identified as zero and the lockouts or stops are readjusted to accommodate the new zero indexing each of the rows or penetrating devices to each other allowing each to operate at the same depth given a common setting. With the zero point identified, each of row units 83 is compared against the zero point and indexed to match the zero point. Depending upon the comparison, the row unit actuation member raises or lowers row unit 83 to correspond to the zero point. With each at least one row unit 83 indexed, planting in the field becomes more uniform and enhances yield at harvest. With the indexing of row units 83, variability associated with the toolbar 10 due to manufacturing and assembly tolerances and wear patterns on individual components is reduced. In addition, in operation with this setup, row units 83 can have planting depth modified once and still maintain uniform planting of seed.

In another embodiment, multiple row units 83 are mounted to a sectional support member that is a sectional configuration. A sectional configuration aids in utilizing a subset of row units 83 and provides greater freedom to accommodate a wider range of row planters with one toolbar configuration. Each section of the sectional configuration supports a predetermined number of row units 83. The predetermined number of row units are attached to one another with a sectional support member. The sectional support member is mounted to a first plate with a first mating surface that is attached to each section of the sectional configuration. A second plate with a second mating surface is attached to the sectional support member. Placement of the sectional support member with the corresponding section of the sectional configuration engages the first mating surface with the second mating surface in a locking arrangement. The locked arrangement maintains engagement between the sectional configuration and the sectional support member in operation and is adapted to have the second plate rotate about the first plate depending on the contour of the field. Rotation of the second plate is limited by a stop on the first plate to less than approximately +/−5 degrees.

Figure 9:
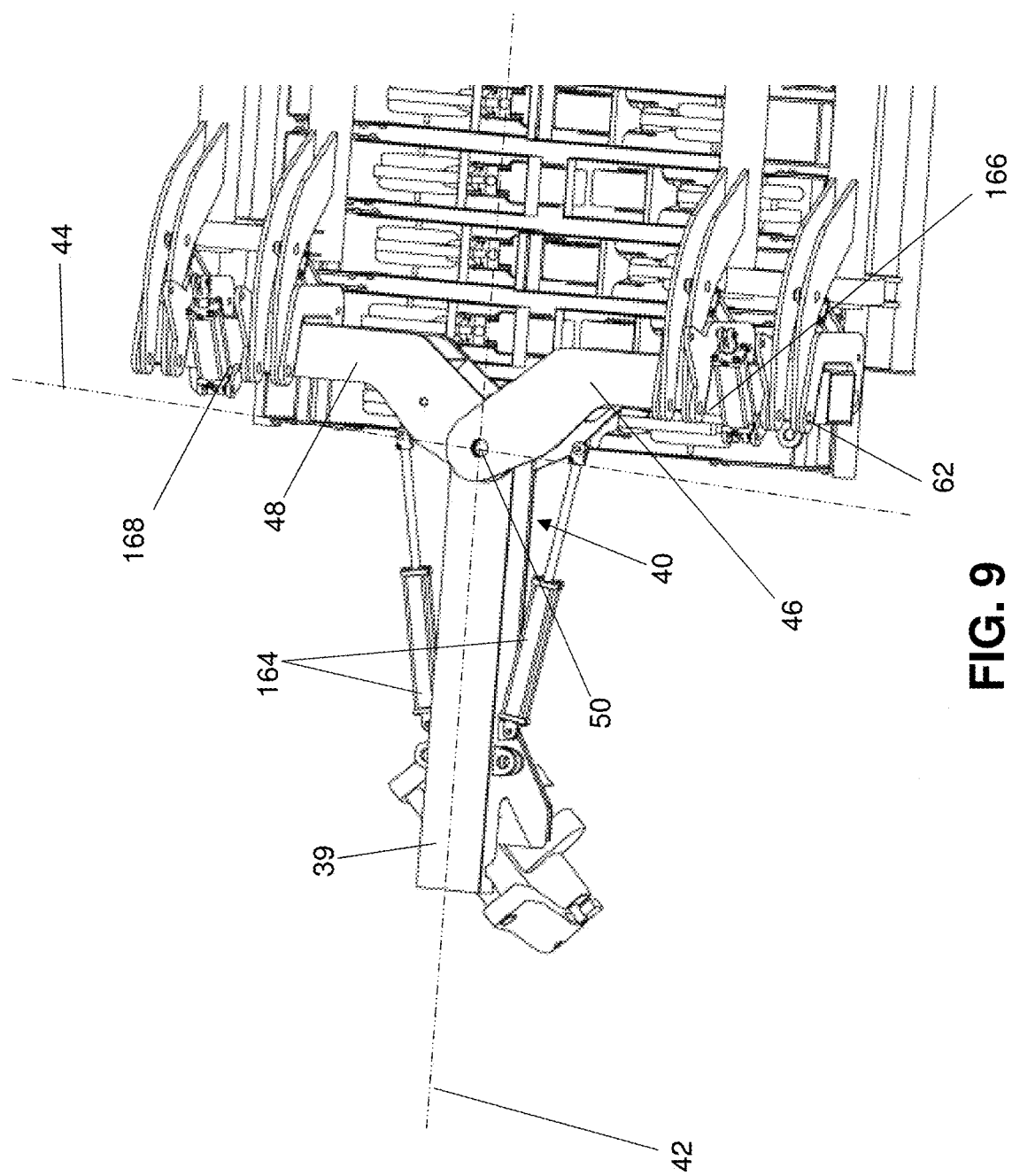
FIG. 9 is a perspective sectional view in the direction of arrows E-E in FIG. 8 of the present agricultural toolbar for use with a tractor in transport position with platform removed.

Referring to FIGS. 1, 2, 8 and 9, toolbar 10 is shown in a working position in FIGS. 1 and 2, and in a transport position in FIGS. 8 and 9. As shown in FIG. 9, one or more actuation members 164 has one mounted between center support 14 and a first center end portion 166 of first arm member 46 and the other mounted between center support 14 and a second center end portion 168 of second arm member 48. Actuation of the pair of actuation members 164 moves toolbar 10 from either of working position to transport position, or vice versa. In the working position, first and second arm members 46, 48 are in parallel alignment with first longitudinal axis 42 of center support 14. Orientation of wing assemblies 16 has the third longitudinal axis 58 (see FIG. 2) in perpendicular alignment with first longitudinal axis 42 of center support 14. Orientation of the pair of stabilizer assemblies 18 has mounting member 102 in parallel alignment with first longitudinal axis 42 of center support 14.

Transport position corresponds to the first and second arms 46, 48 being in perpendicular alignment with first longitudinal axis 42 of center support 14. Orientation of wing assemblies 16 has third longitudinal axis 58 in parallel alignment with first longitudinal axis 42 of center support 14. Orientation of the pair of stabilizer assemblies 18 has mounting member 102 in perpendicular alignment with first longitudinal axis 42 of center support 14. Moveable member 106 is in parallel alignment with first longitudinal axis 42 of center support 14 in either of working or transport positions. In another embodiment, the wing assemblies 16 are pivotally mounted to first support member 54. The ability of the pair of stabilizer assemblies 18 to rotate as toolbar 10 is moved from working position to transport position and vice versa, maintains parallel alignment of stabilizer assemblies 18 in either of working/transport positions. Rotation of stabilizer assemblies 18 is achieved using a pair of actuation members to maintain parallel alignment as toolbar 10 is moved from working position to transport position and vice versa. Transport mode is achieved for transport and public right ways and benefits from a narrow footprint in the transport position. Once in transport position, toolbar 10 can nest the row unit 83 of one of wing assemblies 16 with corresponding row unit 83 of another one two wing assemblies 16.

Figure 11:
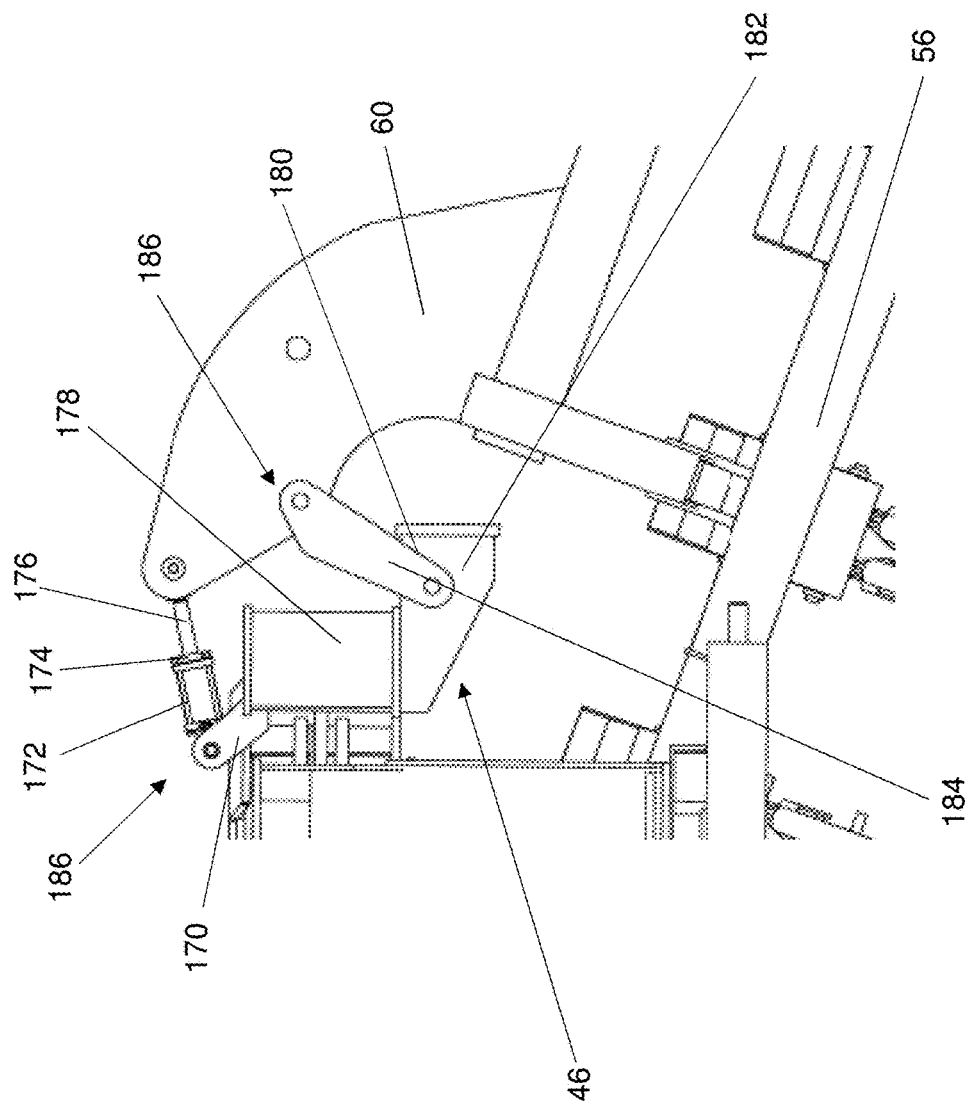
FIG. 11 is a top view of the mechanism for transforming the toolbar from working position to transport position.
Figure 12:
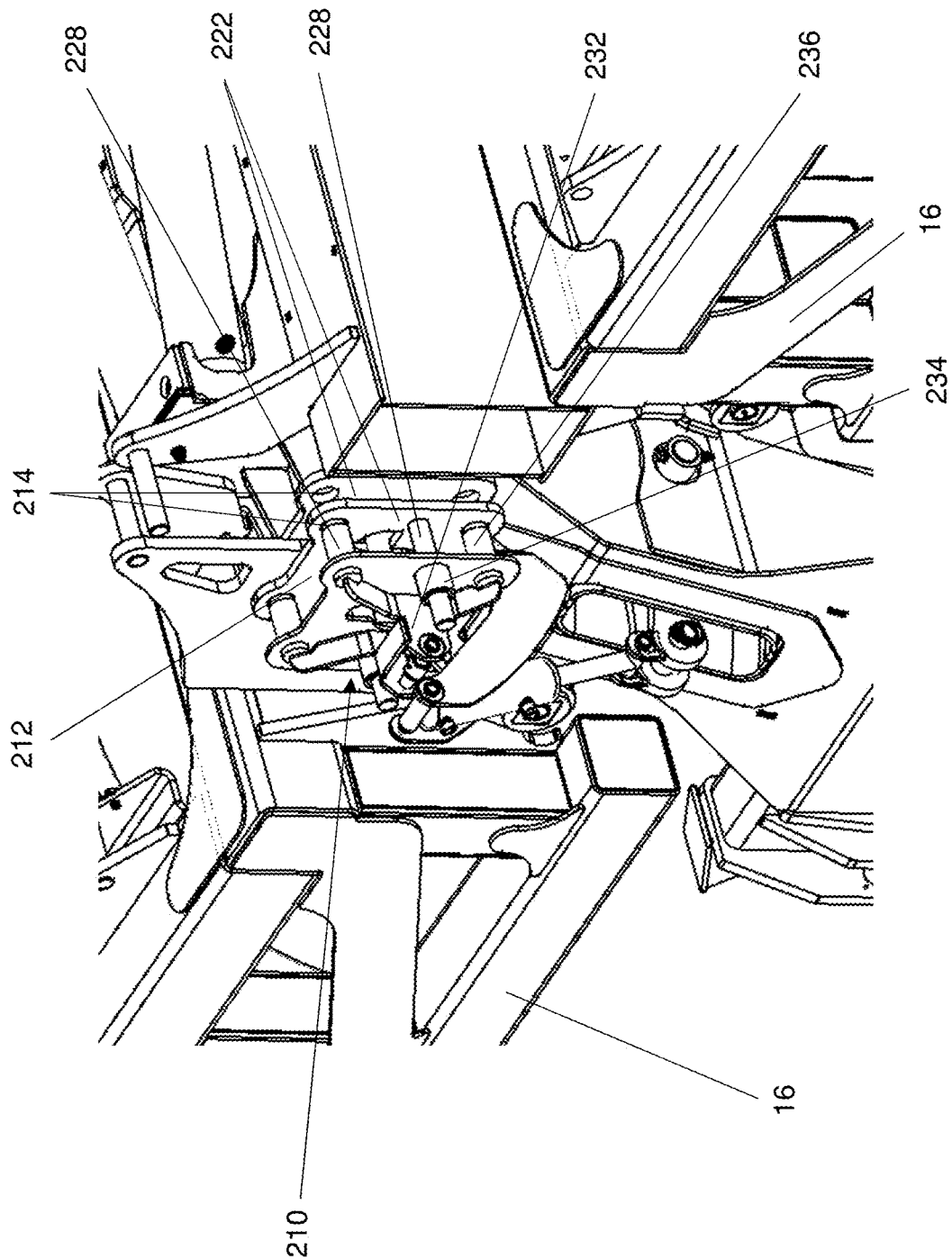
FIG. 12 is a perspective front view of the center mount and first and second arms of the present agricultural toolbar for use with a latching mechanism and a quick connect coupling.
Figure 14:
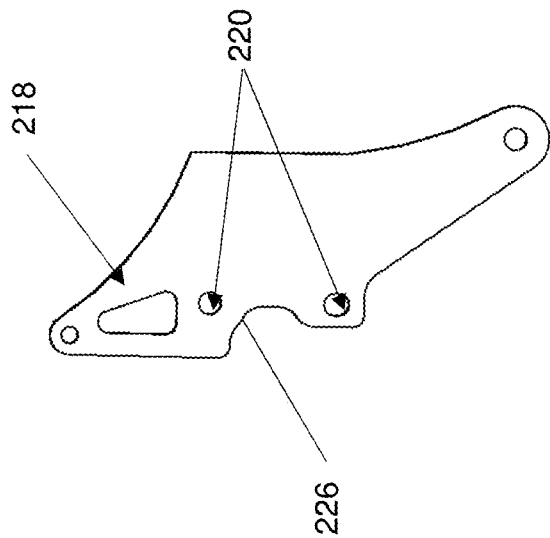
FIG. 14 is a side view of a latching ear of the present agricultural toolbar for use with a latching mechanism and a quick connect coupling.
Figure 13:
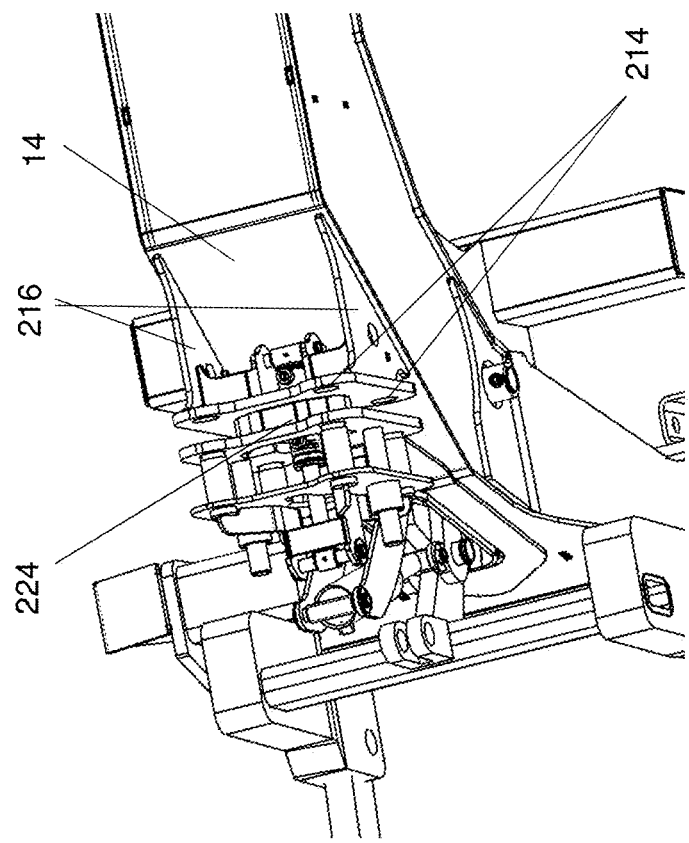
FIG. 13 is a perspective top view of the center mount and first and second arms of the present agricultural toolbar for use with a latching mechanism and a quick connect coupling.
Figure 15:
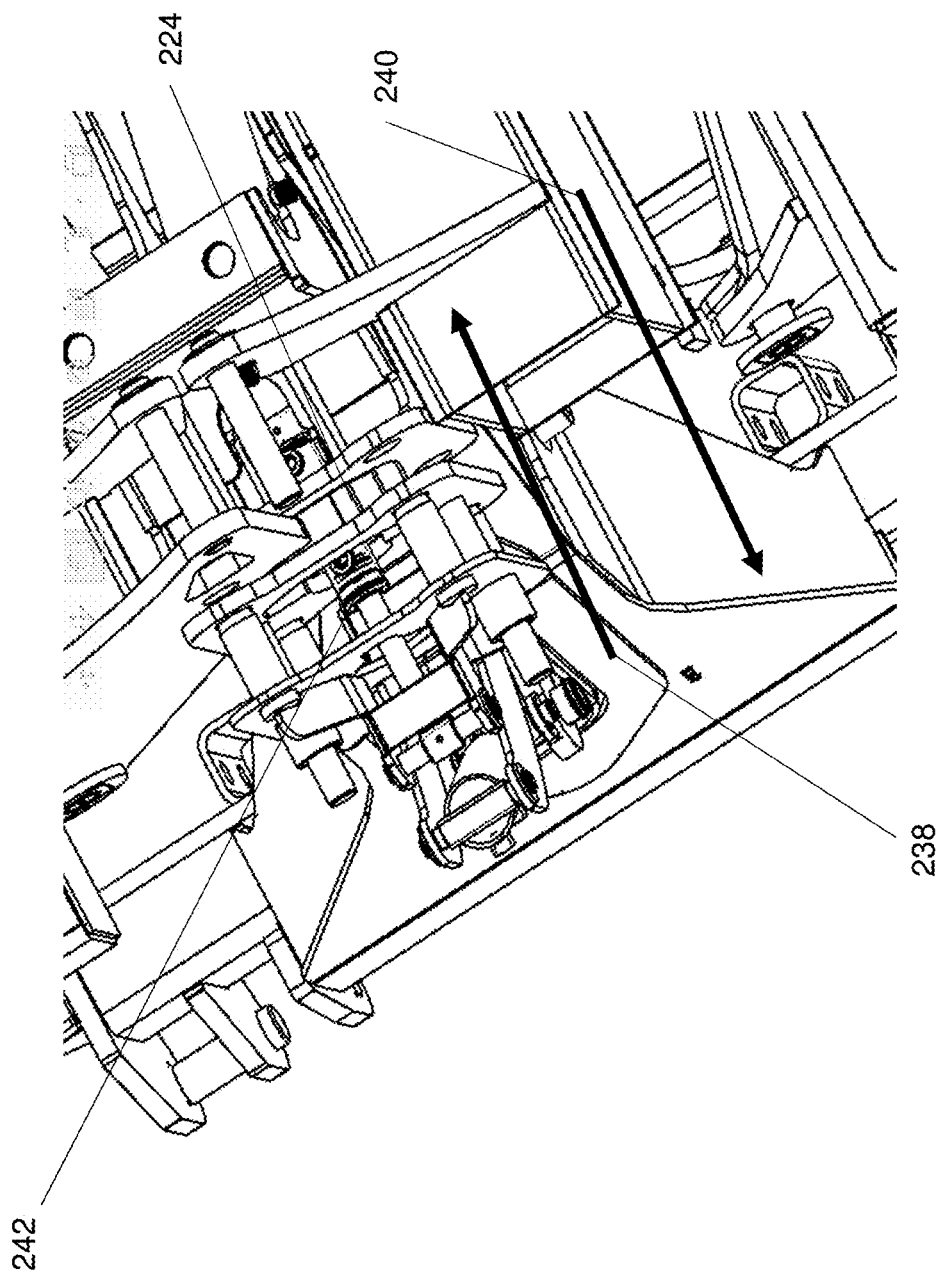
FIG. 15 is a perspective top view of the center mount and first and second arms of the present agricultural toolbar for use with a latching mechanism and a quick connect coupling.
Figure 16:
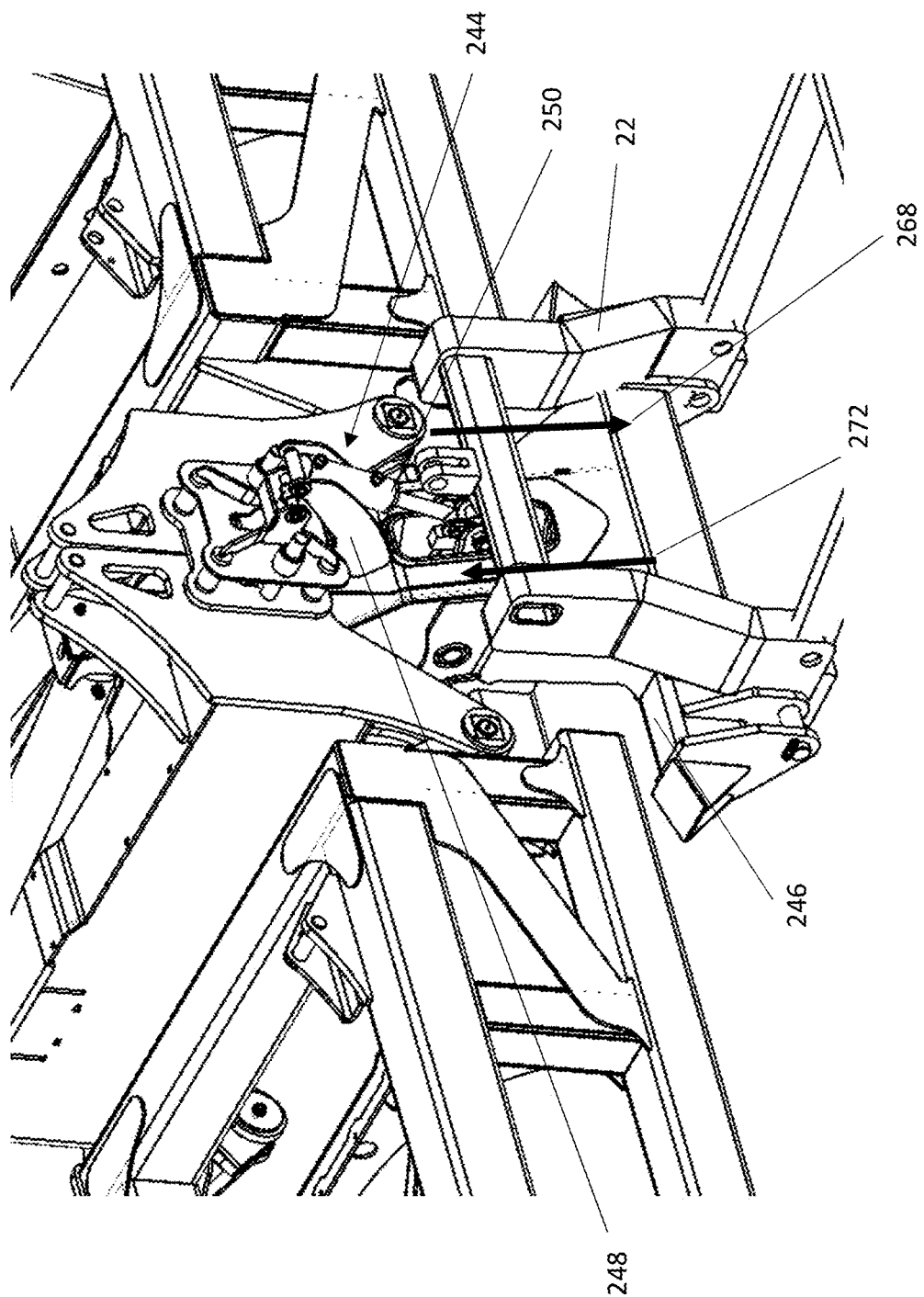
FIG. 16 is a perspective front view of the center mount and first and second arms of the present agricultural toolbar for use with a latching mechanism and a quick connect coupling.
Figure 17:
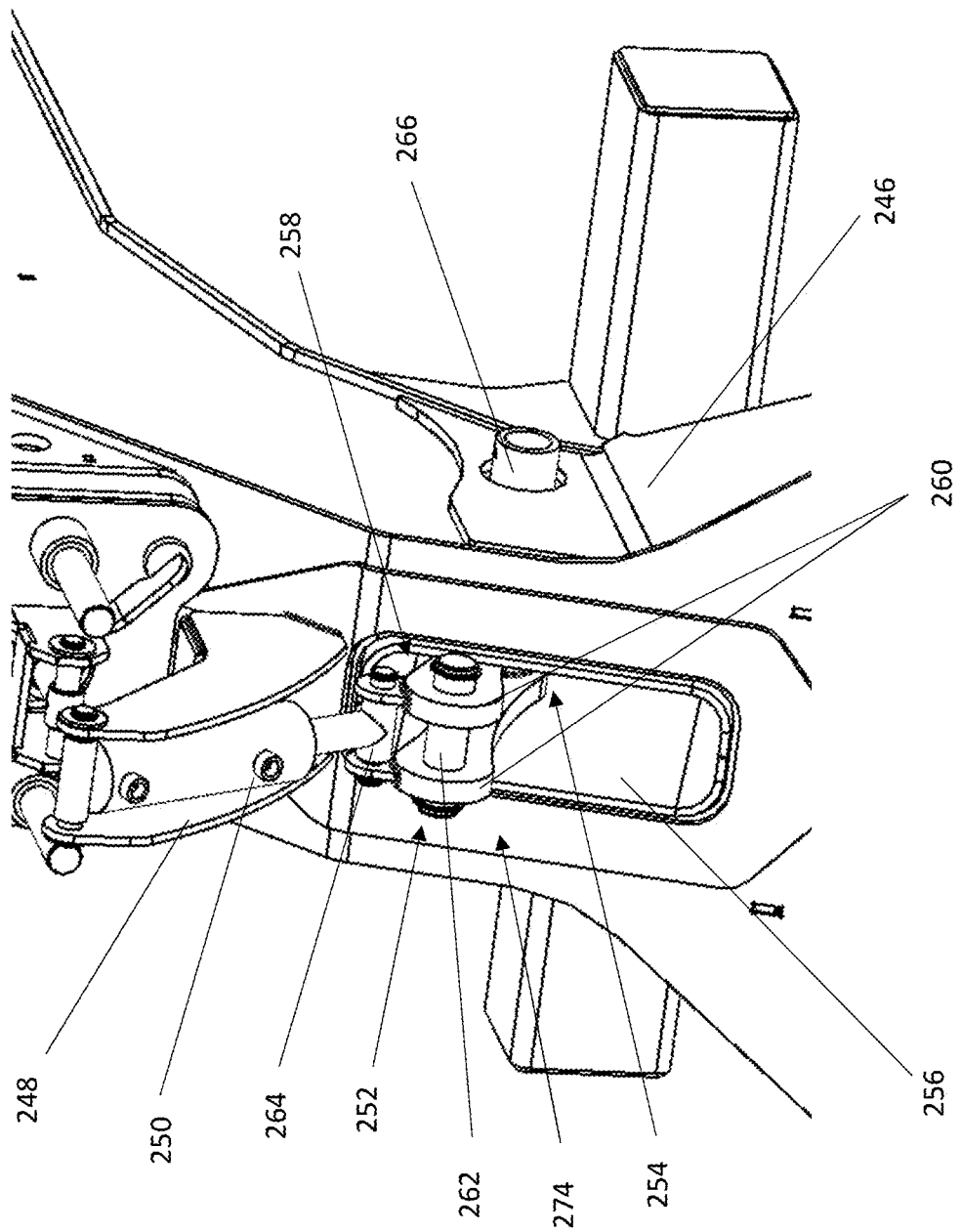
FIG. 17 is a perspective front view of the center mount and first and second arms of the present agricultural toolbar for use with a quick connect coupling.
Figure 19:
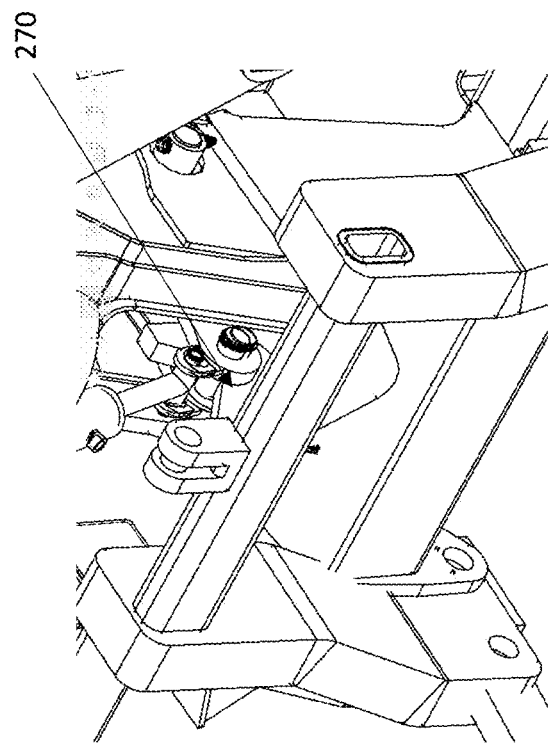
FIG. 19 is a perspective front view of the center mount and first and second arms of the present agricultural toolbar for use with a quick connect coupling.
Figure 18:
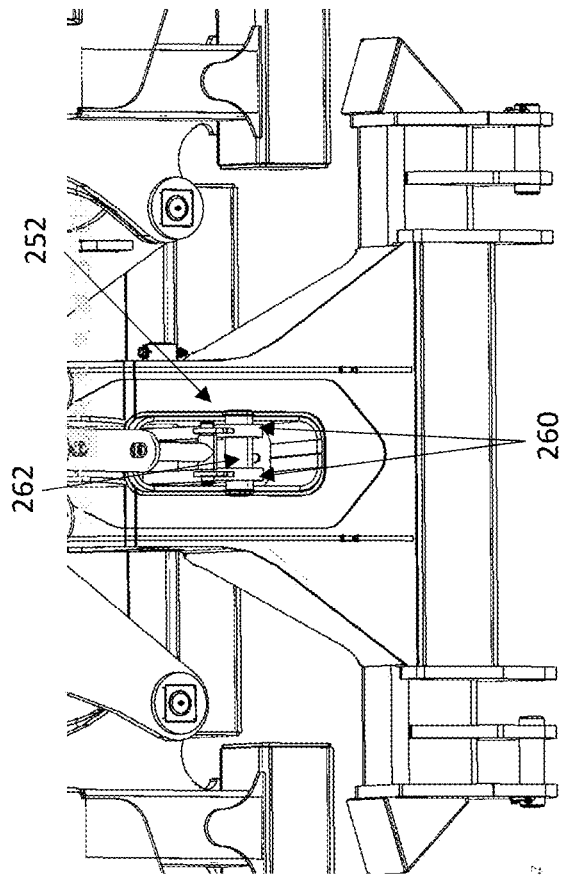
FIG. 18 is a front view of the center mount and first and second arms of the present agricultural toolbar for use with a quick connect coupling.

FIG. 11 shows another embodiment for reducing the risk of collision and damage to items mounted to the toolbar 10. As previously mentioned, depending upon the toolbar configuration, there may be situations during operation where the contour of the land can lead to one of second support members 56 coming into close proximity with another of second support members 56 and/or at least one row unit 83 installed on toolbar 10. A mechanism 186 has one or more flange 170 for mounting at least one actuation member 176 between one of the pair of support members 60 and the first or second arm member 46, 48. Flange 170 is mounted to a top end portion of the first or second arm members 46, 48. A first stop 174 and second stop 180 inhibit movement of the pair of support members 60 before items on the toolbar 10 collide. When the second support member 56 moves in the first direction 96, actuation member 176 retracts and moves one of the pair of support members 60 into proximity with stop plate 172. In addition, link member 184, which that is connected to a bottom end portion 182 of first arm member 46 and one of the pair of support members 60, pivots away from second stop 180. At the end of travel of actuation member 176, one of the pair of support members 60 engages first stop 174.

For illustrative purposes, a single mechanism is described herein. Toolbars 10 can have multiple mechanisms 186 to aid in support and/or movement of second support member 56. When second support member 56 moves in second direction 98, actuation member 176 extends and moves one of the pair of support members 60 out of proximity with stop plate 172. In addition, link member 184 pivots towards second stop 180. At the end of travel of actuation member 176, link member 184 engages second stop 174. The range of motion for the mechanism is designed to stop second support member 56 prior to collision of toolbar items and reduce damage during operation.

In FIGS. 12-15, toolbar 10 is shown in one embodiment with a latching mechanism 210 mounted to the center support 14. In operation when in working position, it is beneficial to have a robust connection between the first and second arms 46, 48 and with the center support 14. As the tractor 12 pulls the toolbar 10 through the field, natural forces have a tendency to try to disconnect the first and second arms 46, 48 from the center support 14.

In one embodiment the first and second arms maintain engagement with the center support 14 with the latching mechanism 210. The latching mechanism 210 is mounted to the center support 14 providing a robust mounting between the latching mechanism 210 and first and second arms 46, 48. The latching mechanism 210 has an alignment member 212 with at least one aperture 214 disposed therein. The alignment member 212 is positioned relative to the first and second arms 46, 48 using a pair of mounting flanges 216. In the present description, the pair of mounting flanges 216 are welded to the center support 14 but other types of mounting mechanisms, such as fasteners, channel, and metal forming, can be employed. The first and second arm members 46, 48 each have a latching ear 218 adjacent to the second end portion 36 of the center support 14 when in working position. Each latching ear 218 has at least one aperture 220. In working position, the at least one aperture 214 of the alignment member 212 is in general alignment with the at least one aperture 220 of the latching ear 218.

In another embodiment, the alignment member 212 can be made of a pair of plates 222 that are spaced apart. Spacing of the pair of plates 222 accommodates positioning of the latching ear 218 of the first and second arm members 46, 48 between the pair of plates 222. In general, the spacing is defined by the use of a spacer 224 mounted to each of the pair of plates 222. The spacer 224 generally matches a contour 226 formed in each latching ear 218 and the alignment member 212 is positioned minimally from the latching ear 218.

In extreme field conditions where impacts on the toolbar from difficult terrain and impediment, such as, rocks and plant residue, additional support of the first and second arms 46, 48 can be achieved by having the spacer 224 periodically engage the latching ear 218 and limit movement of the first and second arms 46, 48. To assist in alignment between the at least one aperture 214 of the alignment member 212 with the at least one aperture 220 of the latching ear 218 and at least one alignment pin 228 is mounted to the alignment member 212. With the alignment member 212 in alignment with the latching ear 218, a latching mechanism 230 is used to latch the first and second arms 46, 48 to the center support 14 when in working position. The latching mechanism 230 has latching member 232 with at least one bushing 234 mounted on the latching member 232 in general alignment with the at least one alignment pin 228. To aid in latching the first and second arms 46, 48 with the center support, the latching member 232 has at least one latching pin 236 in general alignment with the at least one aperture 214 of the alignment member 212 and the at least one aperture 220 of each of the first and second arm members 46, 48. The latching member 232 is in slidable engagement with the at least one alignment pin 228. The at least one bushing 234 guides the at least one latching pin 236 relative to the at least one alignment pin 228. The latching member 232 slide relative to the at least one alignment pin 228 in a first direction 238 and a second direction 240.

An actuation member 242 is mounted between the latching member 232 and the alignment member 212. In the present description, the actuation member is hydraulic, but other types of actuation, such as pneumatic and electrical actuation, can be employed. Actuation of the actuation member 242 in a first direction 238 slides the latching member 232 towards the alignment member 212 along the at least one alignment pin 228. Further movement in the first direction 238 passes the at least one latching pin 236 through the at least one aperture 214 of the alignment member 212 and each of the at least one aperture 220 of the first and second arms 46, 48. With further movement of the latching member 232 in the first direction 238 sliding further along the at least one alignment pin 228 latches the first and second arms 46, 48 together and to the center support 14. With movement completed in the first direction 238, the latching member 232 engages the alignment member 212. Latching the first and second arms 46, 48 provides a robust connection and maintains the toolbar 10 in proper position when in working position. Upon actuation of the actuation member 242 in an opposite direction, namely, second direction 240, the latching member 232 slidably moves along the at least one alignment pin 228 moving the latching member 232 away from the alignment member 212. Further movement of the latching member 232 in the second direction 240 disengages the at least one latching pin 236 from the at least one aperture 220 of the latching ear 218 of the first and second arm members 46, 48 and providing independent movement of each of the first and second arm members 46, 48.

FIGS. 16-19 show the tractor mount 22 as a quick connect coupling 244 adapted to connect toolbar 10 to the tractor 12 using the three-point hitch. The quick connect coupling 244 has a lower support member 246 that is mounted to the center support 14 and provides a rigid connection with the three-point hitch. In the present description, the lower support member is welded but other types of mounting mechanisms can be used, such as fasteners, adhesives, u-joints and pins. The lower support member 246 is releasably mounted to two of three points on the three-point hitch. An actuation support member 248 is mounted to the center support 14. The actuation support member 248 is adapted to support one end of an actuation member 250 that is used with the quick connect coupling 244.

A link member 252 has a first end portion 254 disposed in a slot 256 of the center support 14. The first portion 254 is pinned to the center support 14 and adapted to rotate about the pinned connection 266. The link member 252 has a second end portion 258. In the present description, the link member 252 is formed using a pair of plates 260 that are pinned together using a quick connect pin 262. In addition, the link member 252 has a connecting pin 264 attached to the link member 252 and adapted to connect another end of the actuation member 250 to the link member 252. With the actuation member 250 mounted to the actuation support member 248 and the link member 252 adapted to pivot about the pinned connection 266 then actuation of the actuation member 250 will pivotally move the second end portion 258 with the quick connect pin 262 moves upwardly and downwardly. Actuation of the actuation member 250 in a first direction 268 places the link member 252 in a connected position 270. The connected position 270 places the quick connect pin 262 in engagement with one point of the three-point hitch. In the connected position 270 the toolbar 10 is connected to all three of the three-point hitch. Actuation of the actuation member 250 in a second direction 272 places the link member 252 in a disconnected position 274. In the disconnected position 274 the toolbar 10 is connected to two points of the three-point hitch. The quick connect coupling 244 provides the ability to move the toolbar 10 from the connected position 270 when in working position to a disconnected position 274 when in transport position and vice versa quickly and easily. In addition an actuator (not shown) can be mounted between the tractor mount 22 and the tractor 12. Actuation of the actuator maintains the three-point hitch in a vertical position when transitioning from working to transport position and vice versa.

Figure 20:
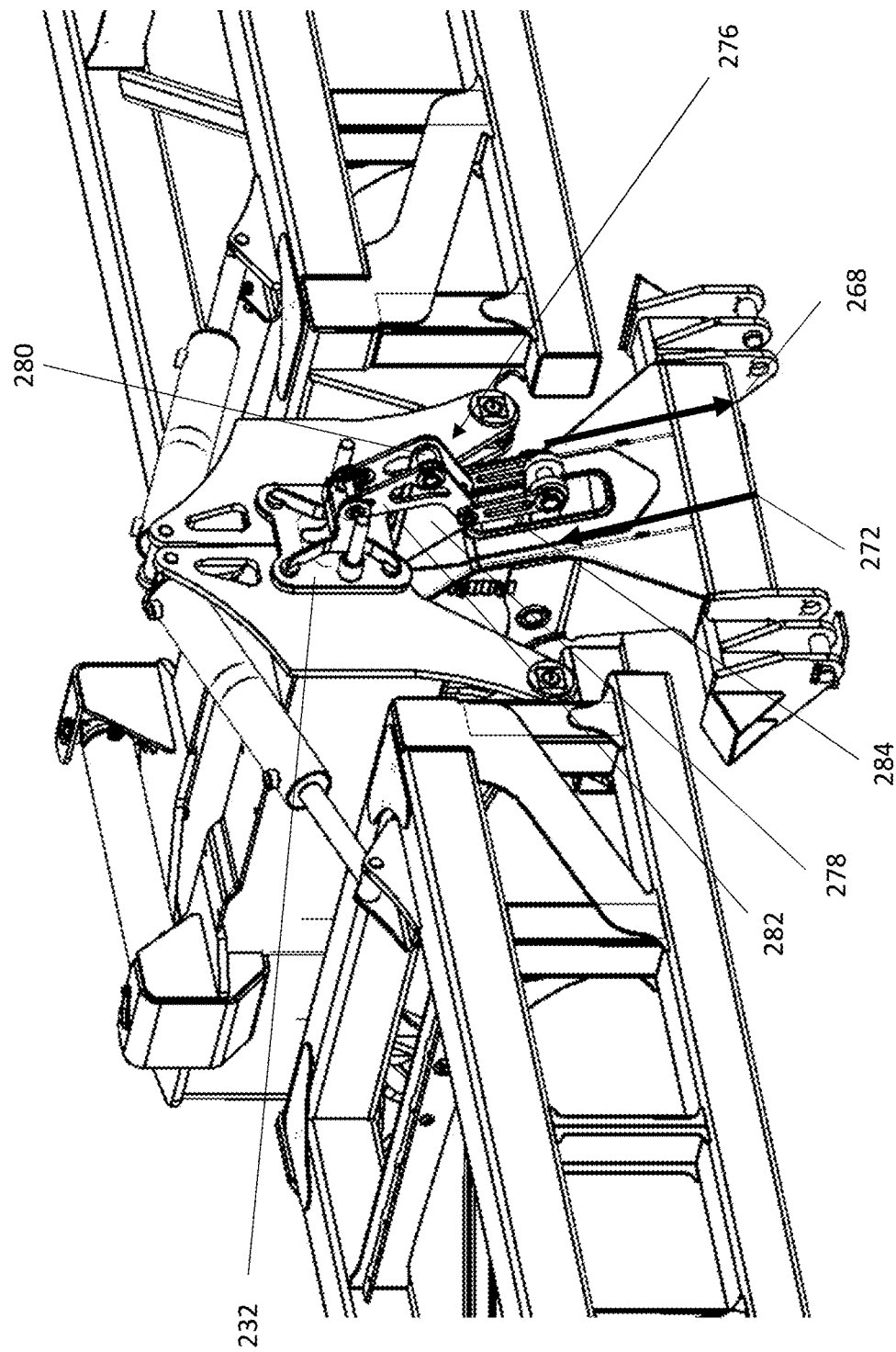
FIG. 20 is a perspective front view of the center mount and first and second arms of the present agricultural toolbar for use with an alternate embodiment of the latching mechanism and a quick connect coupling.

FIG. 20 shows the latching mechanism 210 moving in tandem with the quick connect coupling 244. In this embodiment, a link assembly 276 connects the latching mechanism 210 with the quick connect coupling 244. The link assembly has a link mount member 278 mounted to the center support 14. The link mount member provides a central pivot point 280 for connecting with a latching link 282. The latching link 282 is in pivoting engagement with the link mount member 278. A quick connect link 284 is fastened to the latching link 282 in pivoting engagement. Engagement of the latching link 282 and quick connect link provides the ability to move the latching mechanism 210 and the quick connect coupling 244 simultaneously. The latching mechanism 210 has the actuator member 242 mounted between the latching member 232 and the alignment member 212. Actuation of the actuation member 242 in a first direction 238 slides the latching member 232 towards the alignment member 212 along the at least one alignment pin 228. Further movement in the first direction 238 passes the at least one latching pin 236 through the at least one aperture 214 of the alignment member 212 and each of the at least one aperture 220 of the first and second arms 46, 48. With further movement of the latching member 232 in the first direction 238 sliding further along the at least one alignment pin 228 latches the first and second arms 46, 48 together and to the center support 14. With movement completed in the first direction 238, the latching member 232 engages the alignment member 212.

Latching the first and second arms 46, 48 provides a robust connection maintains the toolbar 10 in proper position when in working position. In addition, actuation of actuation member 242 rotates the latching link 282 about the central pivot point 280. Rotation of the latching link moves the quick connect link 284 in the first direction 268 places the quick connect link 284 in a connected position 270. The connected position 270 places the connecting pin 264 in engagement with one point of the three-point hitch. In the connected position 270 the toolbar 10 is connected to all three of the three-point hitch. Actuation of the actuation member 242 in an opposite direction, namely, second direction 240, has the latching member 232 slidably moveable along the at least one alignment pin 228 moving the latching member 232 away from the alignment member 212. Further movement of the latching member 232 in the second direction 240 disengages the at least one latching pin 236 from the at least one aperture 220 of the latching ear 218 of the first and second arm members 46, 48 and provides independent movement of each of the first and second arm members 46, 48. In addition, actuation of actuation member 242 rotates the latching link 282 about the central pivot point 280. Rotation of the latching link moves the quick connect link 284 in the second direction 272 places the quick connect link 284 in a disconnected position 274. In the disconnected position 274 the toolbar 10 is connected to two points of the three-point hitch. The link assembly 276 provides the ability to move the toolbar 10 from the connected position 270 when in working position to a disconnected position 274 when in transport position and vice versa quickly and easily.

Figure 21:
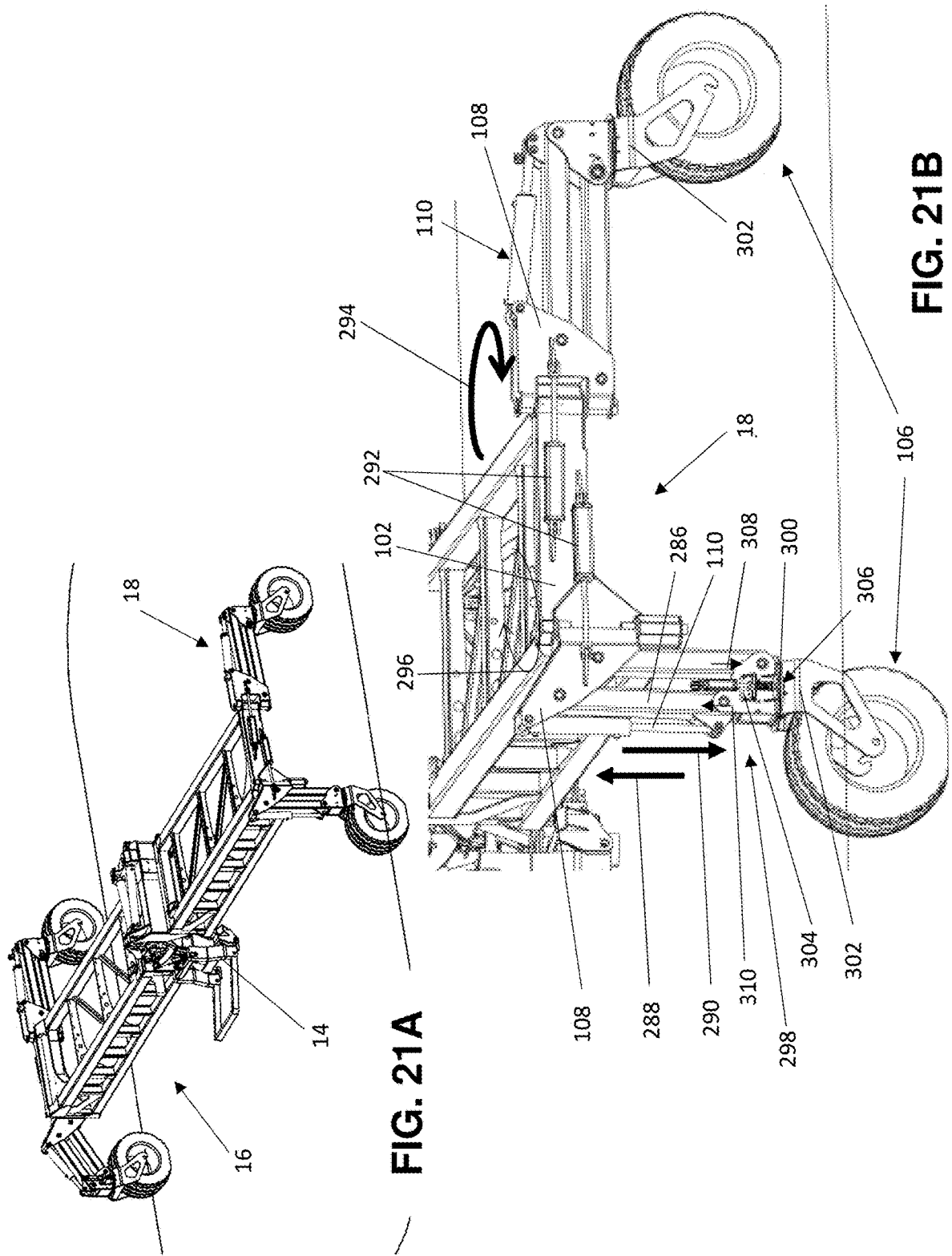
FIGS. 21A and 21B are perspective side views of the center mount and first and second arms of the present agricultural toolbar for use with a pair of stabilizer assemblies in a working position.

FIGS. 21A and 21B show a pair of stabilizer assemblies 18 mounted to the toolbar 10. The pair of stabilizer assemblies 18 are mounted to the first support member 54 and has the multi-piece mounting member 102. The multi-piece mounting member 102 is disposed between a pair of at least one moveable member 106. The multi-piece mounting member 102 has a pair of rigid members 108 that are mounted in a pivoting and/or rotating connection. An adjustment member 286 is fastened to each of the pair of rigid members 108 and each of the at least one moveable member 106. The stabilizer actuation member 110 is disposed between the adjustment member 286 and each of the pair of rigid mounts 108. Actuation of the stabilizer actuation member 110 in a first direction 288 pivots the adjustment member 286 upward. Actuation of the stabilizer actuation member 110 in a second direction 290 pivots the adjustment member 286 downwards. The ability to have the adjustment member 286 move between first and second directions 288, 290 allows the toolbar 10 to adapt to different ground variations when working in a field. A pair of actuation members 292 are mounted between the mounting member 102 and each of the pair of rigid members 108.

In the present description, the mounting is a pinned connection but other connections can be used as long as they provide rotational movement of each of the pair of rigid members 108. Actuation of the pair of actuation members 292 in a first direction 294 rotates the adjustment member 286 inward and towards the mounting member 102. Actuation of the pair of actuation members 292 in a second direction 296 rotates the adjustment member 286 outward and away from the mounting member 102. Movement in the first direction 294 positions the pair of stabilizers 18 in transport position and movement in the second direction 296 positions the pair of stabilizers 18 in working position. In addition, each of the pair of stabilizer assemblies 18 can have a locking mechanism 298, in particular, when the at least one moveable member 106 is in the caster configuration. The locking mechanism 298 has a locking plate 300 in releasable engagement with a caster support member 302. A locking actuator 304 is mounted between the locking plate 300 and the adjustment member 286. The caster support member 302 has an aperture 306 that generally corresponds to the geometry of the locking plate 300. Actuation of the locking actuator 304 in a first direction 308 moves the locking plate 300 into the aperture 306 in the caster support member 302 and locks the caster support member 302 to the adjustment member 286. In this position, the locking plate 300 keeps the caster from rotating about the adjustment member 286. With rotational movement minimized, life of the at least one moveable member 106 is improved during transport. Actuation of the actuation in a second direction 310 unlocks and disengages the locking plate 300 from the caster support member 302. Disengagement of the locking plate 300 allows the caster to rotate about the adjustment member 286. With standard rotational movement, operation of the toolbar 10 in working position is improved.

In working position each of the at least one moveable member 106 is adapted to independently move in the first and second direction 288, 290 based on the contour of the land being traversed. This permits the toolbar 10 to accommodate rolling and non-level fields. In addition, while in transport position the pair of stabilizer assemblies are rotated in the first direction 294. In transport position, the outer adjustment member 286 is positioned vertically with actuation of the stabilizer actuation member 110 and adapted to carry the weight of the toolbar 10. With the weight of the toolbar 10 carried by the outer one each of the pair of stabilizer assemblies 18 allows the inner one of each of the pair of stabilizer assemblies 18 to ride along the ground without the need for actuation of the inner adjustment member 286. This general type of configurations aids in transport of the toolbar 10 by supporting the toolbar 10 at the outer ends of the toolbar and having each of the inner pair of stabilizer assemblies 18 to follow the contour of the land.

Figure 22:
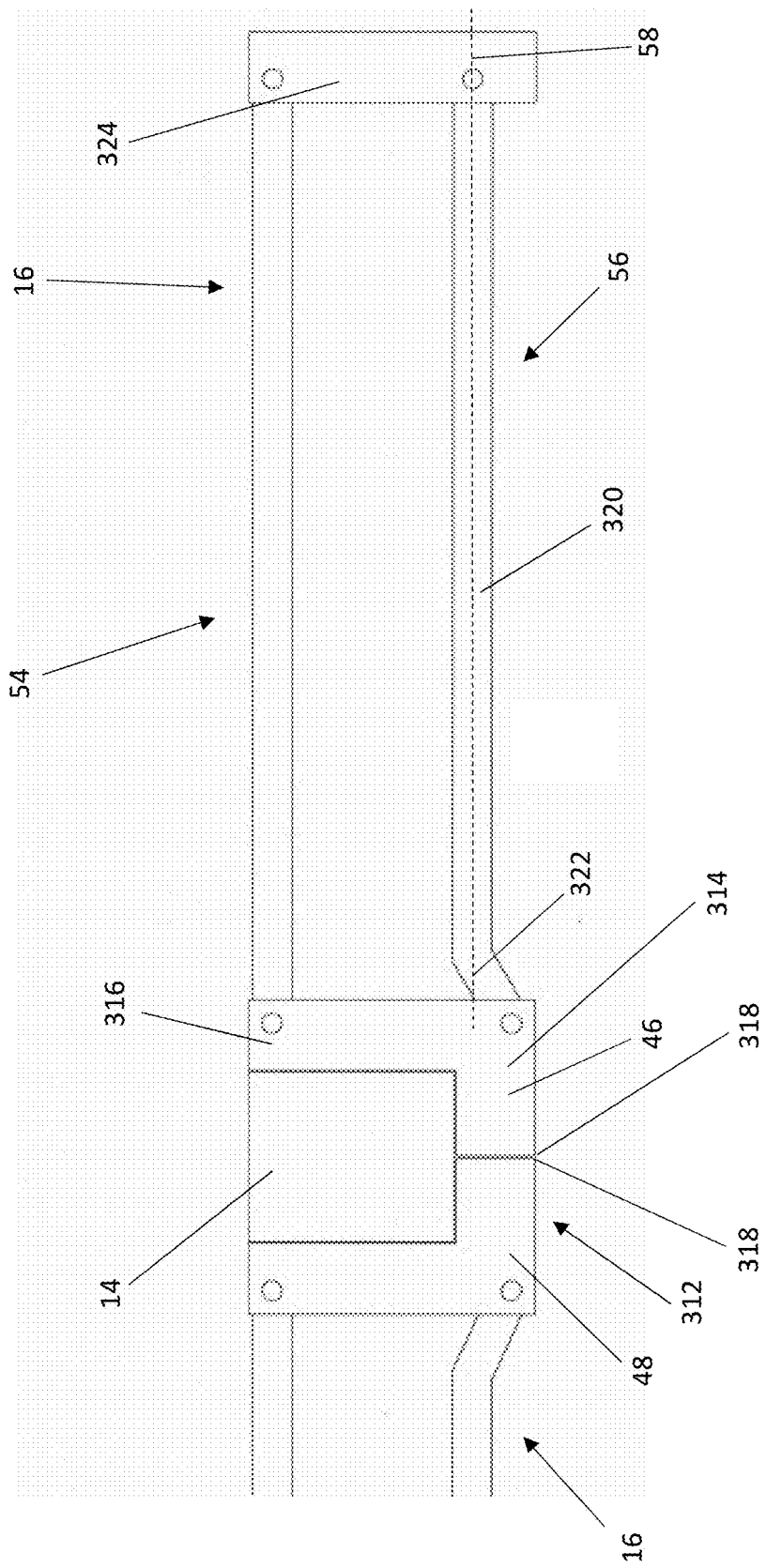
FIG. 22 is a schematic top view of the present agricultural toolbar for use with an alternate embodiment of the at least two wing assemblies.

FIG. 22 shows in schematic form another embodiment of the toolbar 10. The first and second arm members 46, 48 are formed to a general "L" configuration 312. In this configuration each first and second arm members 46, 48 has a lower leg portion 314 and upper leg portion 316. The first and second arm members 46, 48 are mounted to the center support 14 as previously described. Each lower leg portion 314 wraps around the bottom surface 40 of the center support 14 and has an abutment surface 318. With both first and second arm members 46, 48 mounted to the center support 14 the abutment surface 318 associated with the first arm member 46 and the second arm member 48 are in general proximity with one another. This spacing is minimized to adapt to engage the corresponding abutment surfaces 318 when the toolbar is in working position operating in extreme field conditions. Abutting the first arm member 46 with the second arm member 48 provides additional rigidity to each of the at least two wing assemblies 16. Each of the at least two wing assemblies 16 has the first support member 54 and second support member 56 mounted to each first and second arm members 46,48. The second support member 54 has a row unit mounting portion 320 and an arm mounting portion 322. The first support member 54 is pivotally mounted to the upper leg portion 316 of each first and second arm members 46, 48. The arm mounting portion 322 is pivotally mounted to the lower leg portion 314 and transitions to the row unit mounting portion 320. In the present description, pivotally mounting is described but other techniques can be used, such as, actuator mounting and combination of fixed and movable mounting. The arm mounting portion 322 is in general angled position with the third longitudinal axis 58. Angling the arm mounting portion 322 adapts the mounting of the at least two wing assemblies 16 to the first and second arm members 46,48 at a lower point while still having the row unit mounting portion 320 generally parallel with the third longitudinal axis 58. The at least two wing assemblies can have an outer wing support 324 mounted between the first and second support members 54, 56 to enhance stability of the toolbar 10. In the present description, a pivoting connection is utilized between the first and second support members 54, 56 but other connections can be utilized, such as welds and fasteners.

Figure 23:
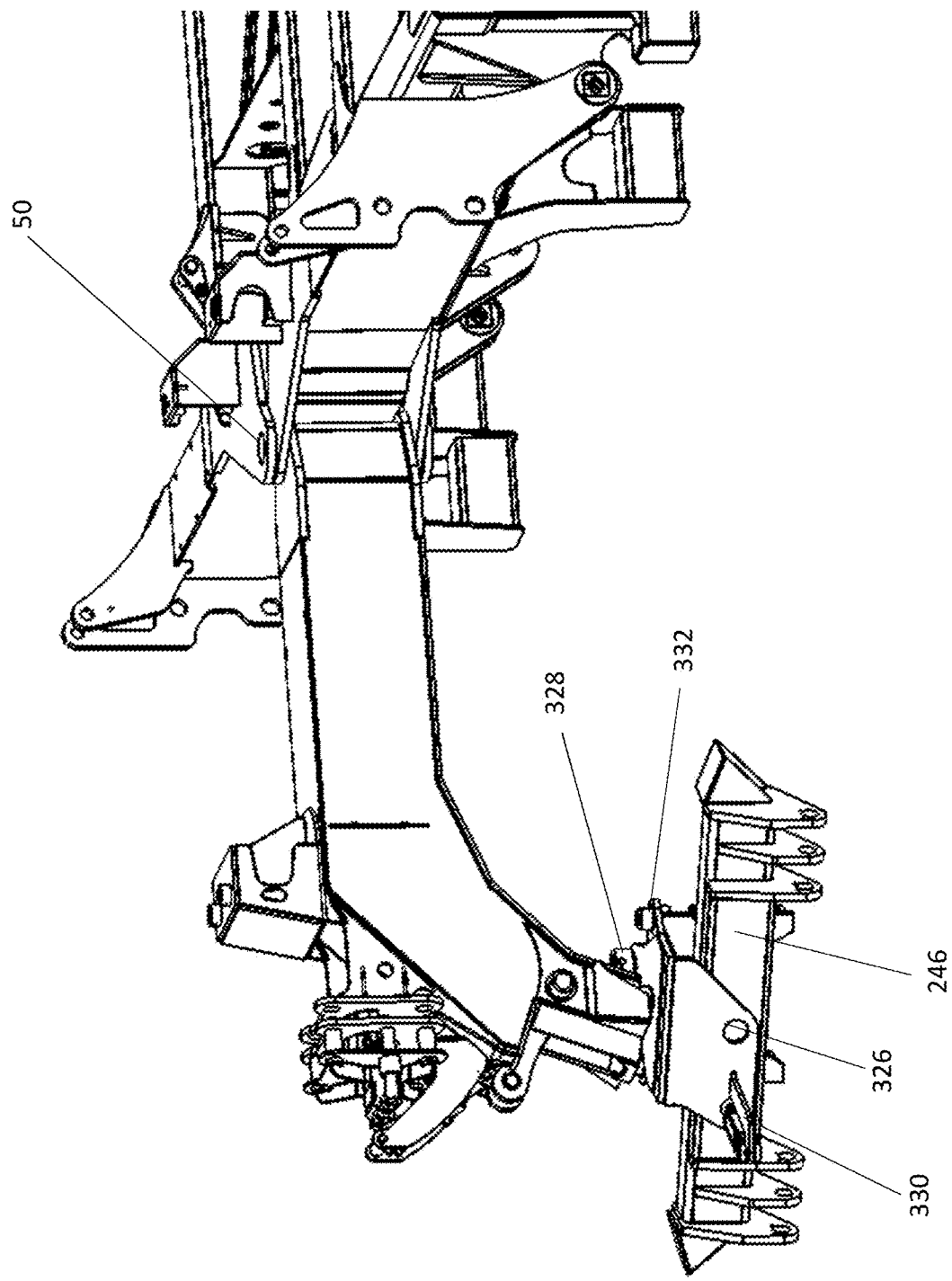
FIG. 23 is a perspective side view of the present agricultural toolbar for use with an alternate embodiment of the lower support member.

Referring to FIG. 23, another embodiment of the lower support member 246 is rotatably mounted to the center support 14. The lower support member 246 is releasably mounted to two of three points on the three-point hitch. The lower support member 246 utilizes a roll pin 326 to connect to the center support 14. In transport position lower support is capable of rotating with the three-point hitch about the first longitudinal axis while maintaining the toolbar 10 in desired position for transport. To enhance steerability, a steering pin 328 can be utilized between the lower support member 246 and the center support 14. The steering pin 328 is adapted to accommodate swinging of the toolbar 10 about the second longitudinal axis 44 while in transport position. In the working position, it is beneficial to prevent pivoting and swinging of the toolbar 10. To aid in maintaining a rigid connection between the three-point hitch and the center support an at least one roll lock actuator 330 and an at least one steering lock actuator 332 are mounted between. Actuation of the roll lock actor 330 generally prevents the lower support member 246 from rotating about the roll pin 326. In a similar manner, actuation of the steering lock actuator 332 generally prevents the lower support member 246 from swinging about the steering pin 328.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An agricultural toolbar for use with a tractor operating in a field and in transport, the agricultural toolbar comprising:
   a center support having a first end portion and a second end portion, said center support defining a first longitudinal axis and second longitudinal axis, said first longitudinal axis perpendicular to said second longitudinal axis;
   a first arm member having a first arm member aperture and pivotally attached to said center support about said second longitudinal axis;
   a second arm member having a second arm member aperture and pivotally attached to said center support about said second longitudinal axis;
   a latching mechanism having an alignment member having an alignment member aperture in general alignment with each of said first arm member aperture, said second arm member aperture and an alignment pin, and said alignment member being mounted to said center support;
   a latching member having a latching pin in general alignment with said alignment member aperture, said first arm member aperture, and said second arm member aperture, and said latching member in slidable engagement with said alignment pin; and
   an actuation member mounted between said alignment member and said latching member, actuation of said actuation member in a first direction passes said latching pin through said alignment member aperture, said first arm member aperture, and said second arm member aperture, movement of said actuation member in a second direction disengages said latching pin from said alignment member and each of said first and second arm members,
   wherein each of said first arm member and second arm member has at least one wing assembly having a first support member and a second support members mounted thereto, a pair of stabilizer assemblies having a mounting member, and at least one movable member, said at least one movable member mounted to said mounting member, and said mounting member mounted to each of said first support member.

2. The agricultural toolbar of claim 1, wherein said latching member has a bushing and said bushing guides said latching member along said alignment pin.

3. The agricultural toolbar of claim 1, wherein each of said pair of stabilizer assemblies has a multi-piece mounting member disposed between a pair of moveable members, said multi-piece mounting member having a pair of rigid members pivotally and rotatably connected, and an adjustment member fastened to each of said at least one of said pair of moveable members.

4. The agricultural toolbar of claim 3, wherein an actuator is mounted between said adjustment member and each of said pair of rigid members and actuation of said actuation member in a first direction pivots said adjustment member upward, actuation of the actuation member in a second direction pivots said adjustment member downwards.

5. The agricultural toolbar of claim 3, wherein said mounting member has a pair of actuation members mounted to each of said mounting member and each of said pair of rigid members, actuation of said pair of actuation members in a first direction rotates said adjustment member inward, actuation of the actuation member in a second direction rotates said multi-piece mounting member outward.

6. The agricultural toolbar of claim 1, wherein each of said pair of stabilizer assemblies has a locking mechanism, said locking mechanism having an actuation member and mounted to an adjustment member, actuation of the actuation member in a first direction locks the at least one movable member to said adjustment member, and actuation of the actuation member in a second direction unlocks said movable member from said adjustment member.

7. The agricultural toolbar of claim 6, wherein actuation in said first direction inhibits at least one of said pair of moveable members from rotating about said adjustment member, and actuation in said second direction permits at least one of said pair of moveable members to rotate about said adjustment member.

8. The agricultural toolbar of claim 1, wherein said pair of stabilizer assemblies has a suspension system adapted to minimize excessive forces on said movable member.

9. An agricultural toolbar for use with a tractor operating in a field and in transport, the agricultural toolbar comprising:
   a center support having a first end portion and a second end portion, said center support defining a first longitudinal axis and second longitudinal axis, said first longitudinal axis perpendicular to said second longitudinal axis:
   a first arm member having a first arm member aperture and pivotally attached to said center support about said second longitudinal axis;
   a second arm member having a second arm member aperture and pivotally attached to said center support about said second longitudinal axis;
   a latching mechanism having an alignment member having an alignment member aperture in general alignment with said first arm member aperture and said second arm member aperture and an alignment pin, and said alignment member being mounted to said center support;
   a latching member having a latching pin in general alignment with said alignment member aperture, said first arm member aperture and said second arm member aperture,
   said latching member in slidable engagement with said alignment pin; and
   an actuation member mounted between said alignment member and said latching member, actuation of said actuation member in a first direction passes said latching pin through said alignment member aperture, said first arm member aperture, and said second arm member aperture,
   movement of said actuation member in a second direction disengages said latching pin from said alignment member and each of said first and second arm members,
   wherein each of said first arm member and said second arm member has at least two wing assemblies mounted thereto, each of said first arm member and said second arm member forming a general "L" configuration having a lower leg portion and an upper leg portion, said lower leg portion located below said center support and each of the lower leg portions being in general proximity to each other while in a working position.

10. The agricultural toolbar of claim 9, wherein each of said at least two wing assemblies has a first support member and a second support member, said first support member mounted to said upper leg portion, and said second support member mounted to said lower leg portion.

11. The agricultural toolbar of claim 10, wherein said second support member has an arm mounting portion and a row unit mounting portion defining a third longitudinal axis, said arm mounting portion being in angled orientation with said third longitudinal axis.

12. The agricultural toolbar of claim 9, wherein said latching member has a bushing and said bushing guides said latching member along said alignment pin.

13. An agricultural toolbar for use with a tractor operating in a field and in transport, the agricultural toolbar comprising:
- a center support having a first end portion and a second end portion, said center support defining a first longitudinal axis and second longitudinal axis, said first longitudinal axis perpendicular to said second longitudinal axis;
- a first arm member having a first arm member aperture and pivotally attached to said center support about said second longitudinal axis;
- a second arm member having a second arm member aperture and pivotally attached to said center support about said second longitudinal axis;
- a latching mechanism having an alignment member having at least one aperture in general alignment with said at least one aperture of each of said first and second arm members and an alignment pin, and said alignment member being mounted to said center support;
- a latching member having a latching pin in general alignment with said at least one aperture of each of said alignment member and each of said first and second arm members, and said latching member in slidable engagement with said alignment pin;
- an actuation member mounted between said alignment member and said latching member, actuation of said actuation member in a first direction passes said latching pin through said at least one aperture of said alignment member and each of said first and second arm members, movement of said actuation member in a second direction disengages said latching pin from said alignment member and each of said first and second arm members; and
- a link assembly connecting said latching member with a quick connect coupling, said quick connect coupling having a lower support member and a link member, and wherein said link assembly has a link mount member, a latching link, a quick connect link, said latching link mounted to said link mount member and pinned to said latching member and said quick connect link.

14. The agricultural toolbar of claim 13, wherein movement of said latching link in a first direction passes said latching pin through said at least one aperture of said alignment member, each of said first and second arm members, and said link member in a connected position, said connected position having a connecting pin in general engagement with a point of a three-point hitch.

15. The agricultural toolbar of claim 13, wherein movement of said latching link in a second direction disengages said latching pin from said alignment member, each of said first and second arm members, and places said link member in a disconnected position, said disconnected position having a connecting pin in disengagement with said a point of a three-point hitch.

16. The agricultural toolbar of claim 13, wherein said latching member has a bushing and said bushing guides said latching member along said alignment pin.

* * * * *